US006418752B2

United States Patent
Kotliar

(10) Patent No.: US 6,418,752 B2
(45) Date of Patent: Jul. 16, 2002

(54) HYPOXIC FIRE PREVENTION AND FIRE SUPPRESSION SYSTEMS AND BREATHABLE FIRE EXTINGUISHING COMPOSITIONS FOR HUMAN OCCUPIED ENVIRONMENTS

(76) Inventor: Igor K. Kotliar, P.O. Box 2021, New York, NY (US) 10159-2021

(*) Notice: Subject to any disclaimer, the term of this patent is extended or adjusted under 35 U.S.C. 154(b) by 0 days.

(21) Appl. No.: 09/750,801

(22) Filed: Dec. 28, 2000

Related U.S. Application Data

(63) Continuation-in-part of application No. 09/551,026, filed on Apr. 17, 2000, now Pat. No. 6,314,754.

(51) Int. Cl.[7] ................................................. F25J 1/00
(52) U.S. Cl. ........................... 62/640; 62/78; 169/45; 169/61
(58) Field of Search ............................ 62/78; 169/45, 169/56, 61

(56) References Cited

U.S. PATENT DOCUMENTS

| | | | | |
|---|---|---|---|---|
| 4,896,514 A | * | 1/1990 | Sugiyama et al. | 62/78 |
| 5,063,753 A | * | 11/1991 | Woodruff | 62/78 |
| 5,388,413 A | * | 2/1995 | Major et al. | 62/911 |
| 5,472,480 A | * | 12/1995 | Barbe | 95/54 |
| 5,649,995 A | * | 7/1997 | Gast, Jr. | 95/54 |
| 5,799,495 A | * | 9/1998 | Gast, Jr. | 62/78 |
| 5,799,652 A | * | 9/1998 | Kotliar | 128/205.11 |
| 5,921,091 A | * | 7/1999 | Foss et al. | 62/46.1 |
| 6,012,533 A | * | 1/2000 | Cramer | 169/45 |

* cited by examiner

Primary Examiner—Ronald Capossela
(74) Attorney, Agent, or Firm—Fire PASS Corp.

(57) ABSTRACT

Fire prevention and suppression systems and breathable fire-extinguishing compositions are provided for rooms, houses and buildings, transportation tunnels and vehicles, underground and underwater facilities, marine vessels, aircraft, space stations and vehicles, military installations and vehicles, and other human occupied objects and facilities. The system provides a low-oxygen (hypoxic) fire-preventive atmosphere at standard atmospheric or slightly increased pressure. The system employs an oxygen-extraction apparatus supplying oxygen-depleted air inside a human-occupied area or storing it in a high-pressure container for use in case of fire. A breathable fire-extinguishing composition, being mostly a mixture of nitrogen and oxygen and having oxygen content ranging from 12% to 17% for fire-preventive environments. The fire-suppression system is provided having fire-extinguishing composition with oxygen concentration under 16%, so when released it creates a breathable fire-suppressive atmosphere having oxygen content from 10 to 16%. A technology for automatically maintaining a breathable fire-preventive composition on board a human-occupied hermetic object is provided.

28 Claims, 20 Drawing Sheets

Altitude or hypobaric environment

Normbaric hypoxic environment

Normbaric normoxic environment

● – oxygen molecules    O – nitrogen molecules

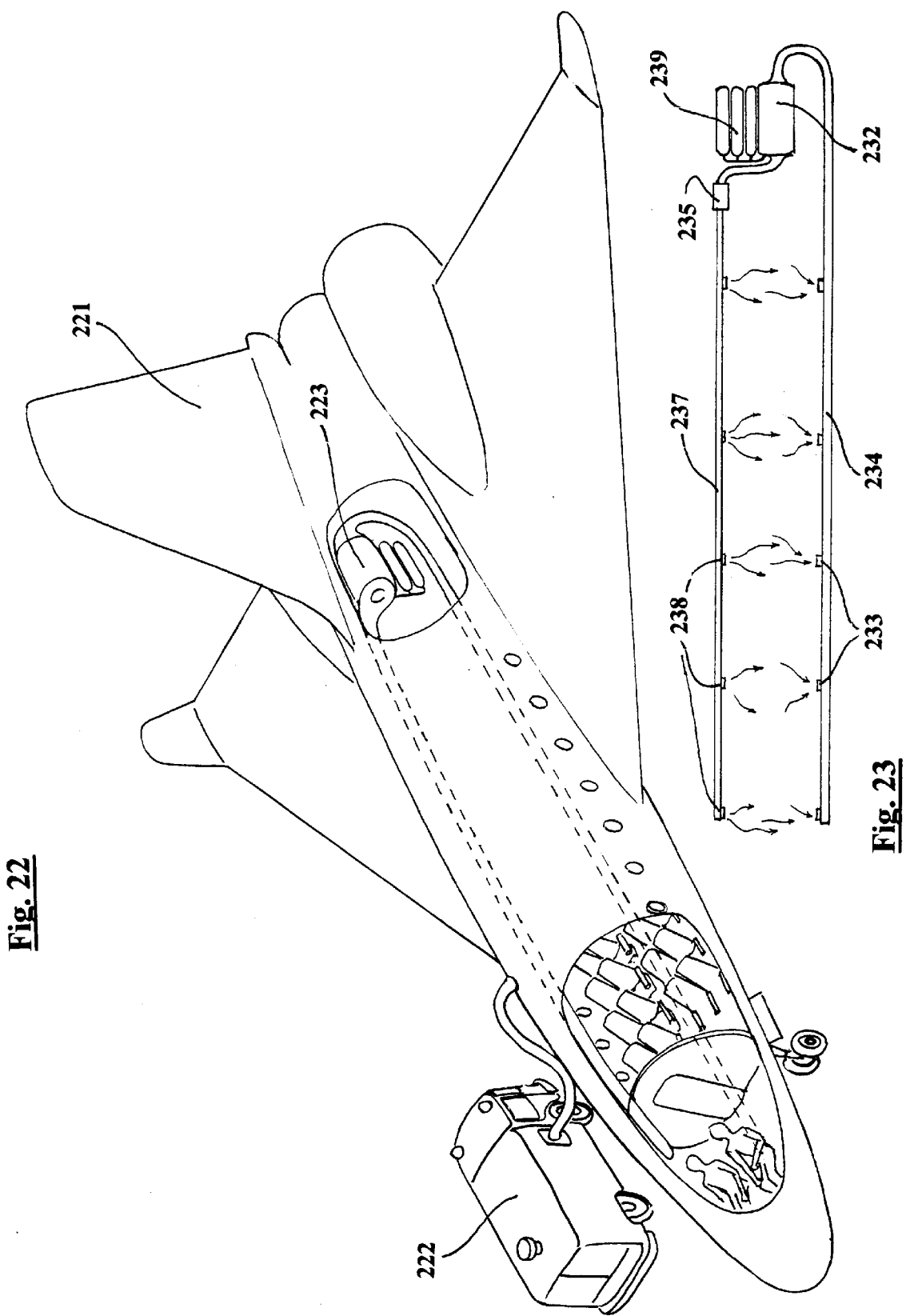

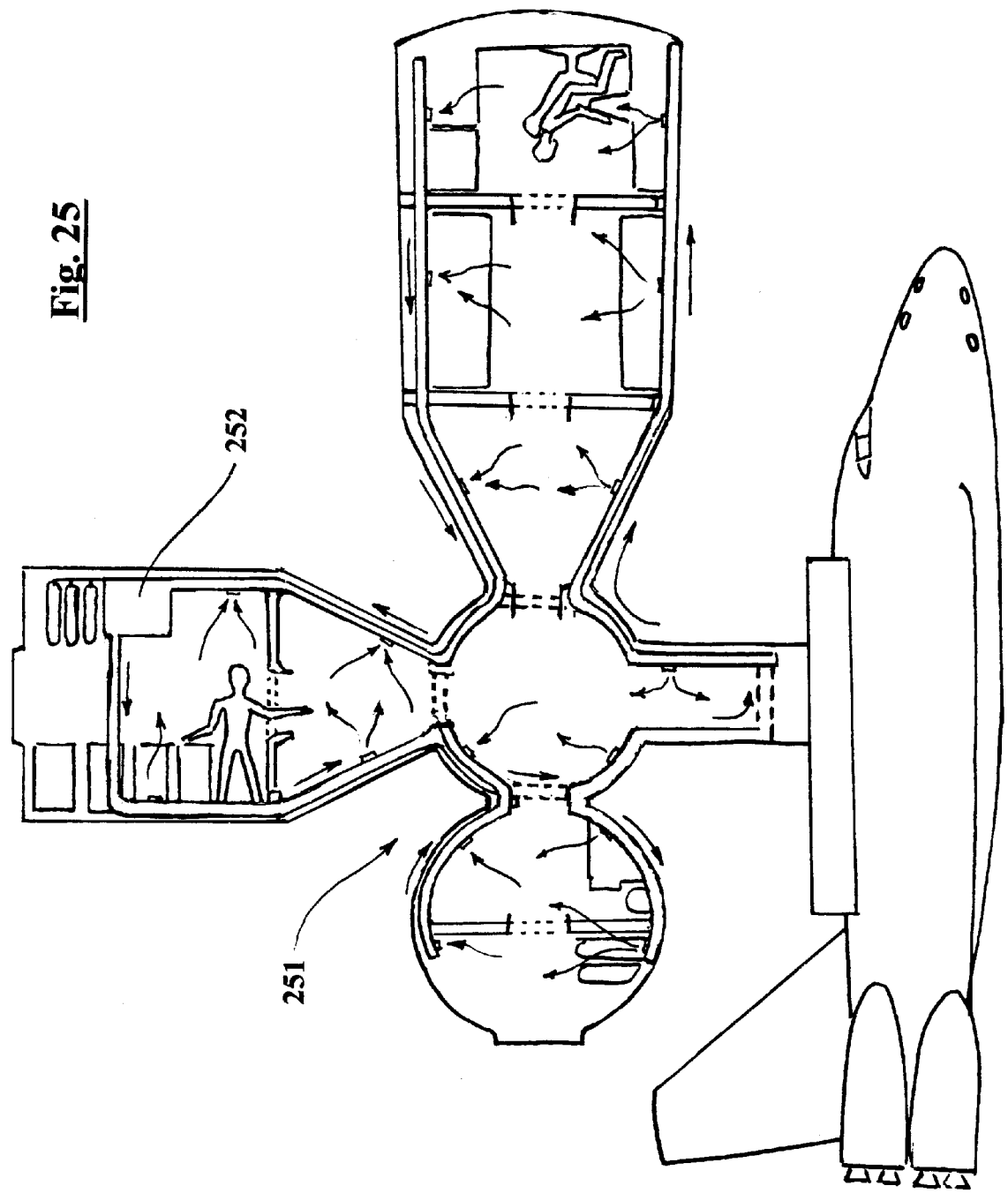

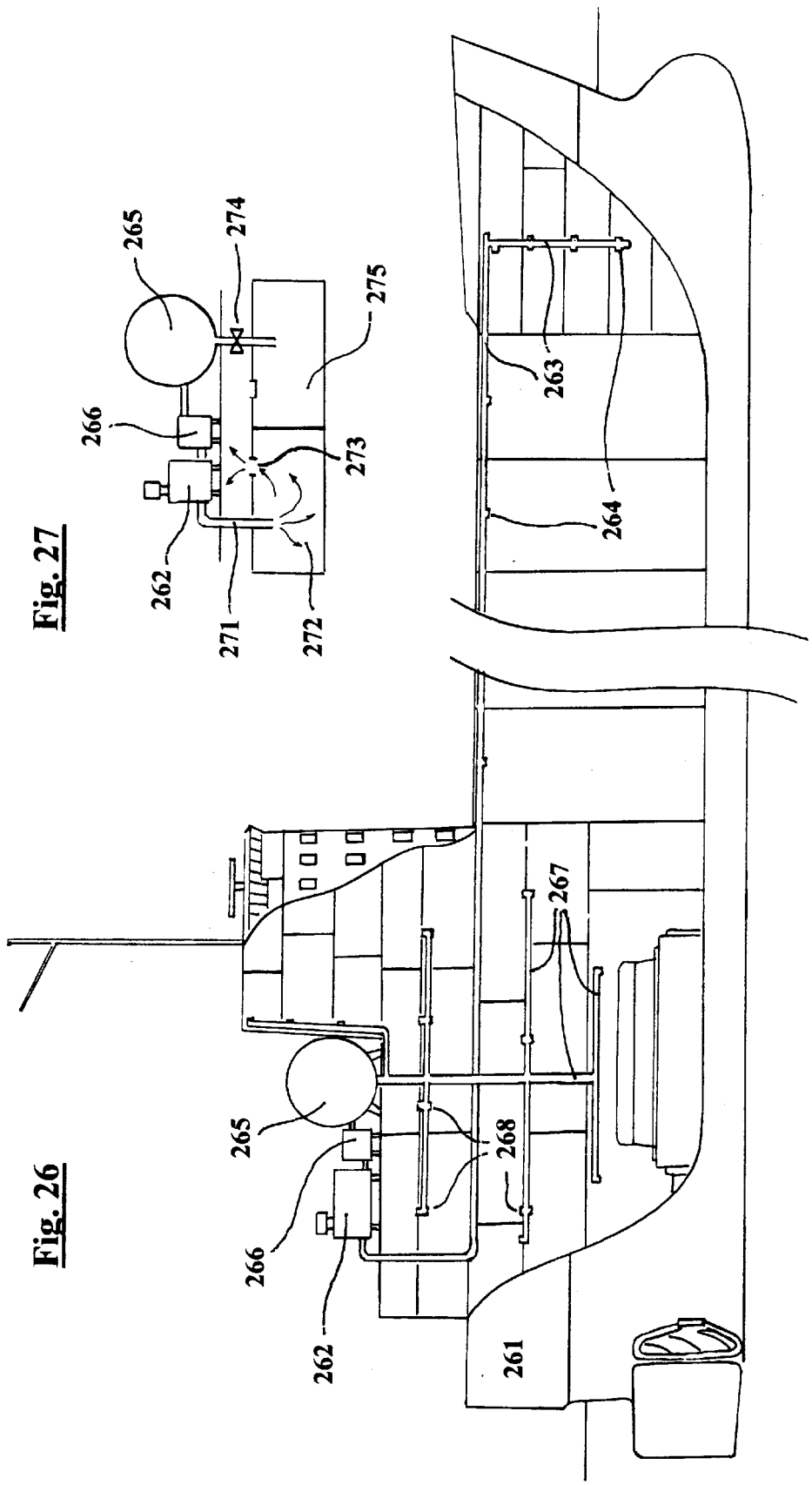

HYPOXIC FIRE PREVENTION AND FIRE SUPPRESSION SYSTEMS AND BREATHABLE FIRE EXTINGUISHING COMPOSITIONS FOR HUMAN OCCUPIED ENVIRONMENTS

This application is a continuation in part of U.S. patent application Ser. No. 09/555,026 "Hypoxic Fire Prevention and Fire Suppression Systems for computer rooms and other human occupied facilities", filed Apr. 17, 2000 now U.S. Pat. No. 6,314,754 B1.

RELATED APPLICATIONS

This invention is related in part to preceding U.S. Pat. No. 5,799,652 issued Sep. 1, 1998.

1. Field of the Invention

The present invention introduces the method, equipment, and composition of a revolutionary fire prevention/suppression system that utilizes a low-oxygen (hypoxic) environment to:

Instantly extinguish an ongoing fire

Prevent a fire from getting started.

With its mode of action based on the controlled release of breathable fire-suppressive gases, this human-friendly system is completely non-toxic, fully automated, and entirely self-sustaining. Consequently, it is ideally suited to provide complete fire protection to houses, industrial complexes, transportation tunnels, vehicles, archives, computer rooms and other enclosed environments.

With the majority of fires (both industrial, and non-industrial) occurring at locations with a substantial amount of electronic equipment, this Fire Prevention and Suppression System (FirePASS™) has the added benefit of requiring absolutely no water, foam or other damaging agent. It can therefore be fully deployed without causing harm to the complex electrical equipment (and its stored data) that is destroyed by traditional fire suppression systems.

While this is extremely important to technology-intensive businesses such as banks, insurance companies, communication companies, manufacturers, medical providers, and military installations; it takes on even greater significance when one considers the direct relationship between the presence of electronic equipment and the increased risk of fire.

2. Description of Prior Art

Current fire suppression systems employ either water, chemicals agents, gaseous agents (such as Halon 1301, carbon dioxide, and heptafluoropropane) or a combination thereof. Virtually all of them are ozone depleting, toxic and environmentally unfriendly. Moreover, these systems can only be deployed post-combustion. Even the recent advent of the Fire Master 200 (FM 200) suppression system (available from Kidde-Fenwal Inc. in the U.S.A.) is still chemically dependant and only retards the progression of fire by several minutes. Once this fire-retarding gas is exhausted, a sprinkler system ensues that results in the permanent destruction of electronic equipment and other valuables.

Exposure to FM-200 and other fire-suppression agents is of less concern than exposure to the products of their decomposition, which for the most part are highly toxic and life threatening. Consequently, there is no fire suppression/extinguishing composition currently available that is both safe and effective.

In terms of train, ship, or airplane fires, the inability to quickly evacuate passengers creates an especially hazardous situation. The majority of the passengers who died in France's Mont Blanc tunnel fire suffocated within minutes. In this case the problem was further compounded by the presence of ventilations shafts. Originally designed to provide breathable air to trapped people, these shafts had the unfortunate side effect of dramatically accelerating he fire's propagation. Especially devastating is the "chimney effect" that occurs in sloped tunnels. An example of this was the fire that broke out in Kaprun's ski tunnel in Austrian Alps.

In addition, ventilation shafts (which are present in virtually all multilevel buildings and industrial facilities) significantly increase the risk of toxic inhalation. This problem is further compounded by the frequent presence of combustible materials that can dramatically accelerate a fire's propagation.

While the proliferation of remote sensors has led to significant breakthroughs in early fire-detection, improvements in the prevention/suppression of fires has been incremental at best. For example, the most advanced suppression system to combat tunnel fires is offered by Domenico Piatti (PCT IT 00/00125) at robogat@tin.it. Based on the rapid deployment of an automated vehicle (ROBOGAT), the Robogat travels to the fire site through the affected tunnel. Upon arrival it releases a limited supply of water and foam to initiate fire suppression. If necessary, the Robogat can insert a probe into the tunnel's internal water supply for continued fire-suppression. This system is severely limited for the following reasons:

The time that lapses between the outbreak of fire and the arrival of the Robogat is unacceptable.

The high temperatures that are characteristic of tunnel fires will cause deformation and destruction of the monorail, water and telecommunication lines.

The fire-resistance of the Robogat construction is highly suspected.

The use of water and foam in high-temperature tunnel fires is only partially effective and will lead to the development of highly toxic vapors that increase the mortality of entrapped people.

There are only 4 current methods of fire suppression in human-occupied facilities:

The use of water

The use of foam

The use of chemical flame inhibitors

The use of gaseous flame inhibitors

The present invention employs a radically different approach: the use of hypoxic breathable air for the prevention and suppression of fire. This hypoxic environment completely eliminates the ignition and combustion of all flammable materials. Moreover, it is completely safe for human breathing (clinical studies have proven that long term exposure to a hypoxic environment has significant health benefits). Hypoxic breathable air can be inexpensively produced in the necessary amount through the extraction of oxygen from ambient air.

In terms of fire prevention, a constantly maintained hypoxic environment can completely eliminate the possibility of fire while simultaneously providing an extremely healthy environment. In terms of suppression, this invention can instantly turn a normoxic environment into a hypoxic environment with absolutely no adverse effects to human life. This is extremely useful in the case of a flash fires or explosions.

Based on the exploitation of the fundamental differences between human physiology and the chemo-physical properties of combustion, this entirely new approach completely resolves the inherent contradiction between fire prevention and providing a safe breathable environment for human beings. Consequently, this invention is a radical advance in the management of fire and will make all current chemical systems obsolete Hypoxic Fire Prevention and Suppression Systems will completely prevent the massive socioeconomic losses that result from the outbreak of fire.

SUMMARY OF THE INVENTION

The principal objects of this invention are as follows:

The provision of a breathable fire-extinguishing composition

A method for producing a fire preventive, hypoxic atmosphere inside human-occupied environments.

The provision of oxygen-depletion equipment that produce s breathable, hypoxic air with fire-extinguishing properties. Such equipment employs the processes of molecular-sieve adsorption, membrane-separation and other oxygen extraction technologies.

The provision of breathable fire-extinguishing compositions for continuous or episodic use in human occupied environments.

The provision of the equipment and the method to instantly produce a fire-suppressive, oxygen-depleted atmosphere, where people can safely breath (without respiratory-support means). This can be accomplished at either a standard or slightly increased atmospheric pressure with an oxygen content ranging from 10% to 17%.

The provision of a method for producing a fire-preventive atmosphere for hermetic sealed objects with controlled temperature and humidity levels. This can be accomplished by changing the initial settings of current life-support systems and reprogramming them.

The provision of hypoxic fire preventive/suppressive environments inside tunnels, vehicles, private homes (separate rooms or entire structures), public/industrial facilities and all other applications for non-hermetic human occupied environments.

The provision of a fire suppression system that instantly releases stored oxygen-depleted gas mixture from a high-pressure pneumatic system or container.

The ability to localize a fire site through the use of drop curtains, doors or other means of physical separation; with the subsequent release of breathable, fire-suppressive gas mixtures.

BRIEF DESCRIPTION OF THE DRAWINGS

FIG. 22 presents the implementation of the FirePASS in the next generation of airliners that can fly above the Earth's atmosphere (or for space vehicles).

FIG. 23 illustrates the general working principle of the autonomous air-regeneration system for hermetic human-occupied spaces.

FIG. 25 presents a schematic view of a hypoxic fire-extinguishing breathable composition as part of the internal atmosphere of a space station.

FIG. 26 presents a schematic view of the Marine Fire-PASS system for use in marine vessels, e.g. tankers, cargo, cruise ships, or military vessels.

FIG. 27 illustrates the working principle of the Marine FirePASS.

DESCRIPTION OF THE INVENTION

This invention is based on a discovery made during research conducted in a Hypoxic Room System manufactured by Hypoxico Inc. The inventor discovered that that the processes of ignition and combustion in a normbaric, hypoxic environment are far different from the ignition and combustion process that occurs in a hypobaric or natural altitude environment with the same partial pressure of oxygen.

For example, air with a 4.51" (114.5 mm of mercury) partial pressure of oxygen at an altitude of 9,000' (2700 m) can easily support the burning of a candle or the ignition of paper.

However, if we create a corresponding normbaric environment with the same partial pressure of oxygen (4.51" or 114.5 mm of mercury), a candle will not burn and paper will not ignite. Even a match will be instantly extinguished after the depletion of the oxygen-carrying chemicals found at its tip. For that matter, any fire that is introduced into this normbaric, hypoxic environment is instantly extinguished. Even a propane gas lighter or a gas torch will not ignite in this environment This surprising observation leads to an obvious question: "Why do two environments that contain identical partial pressures of oxygen (identical number of oxygen molecules per specific volume) effect the processes of ignition and combustion so differently?""

The answer is simple: "The difference in oxygen concentration in these two environments diminishes the availability of oxygen to support combustion. This is due to nitrogen molecules interfering with the kinetic properties of oxygen molecules". In other words, the increased density of nitrogen molecules provides a "buffer zone" that obstructs the availability of oxygen.

Figure 1:
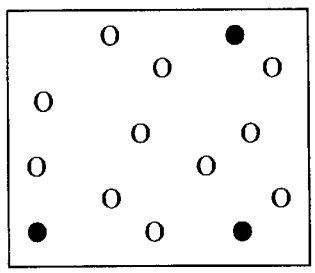
FIG. 1 presents a schematic view of the density of oxygen and nitrogen molecules in a hypobaric or natural altitude environment.

FIG. 1 presents a schematic view of the density of oxygen and nitrogen molecules in a hypobaric or natural environment at an altitude of 9,000'/2.7 km. (All other atmospheric gases are disregarded in order to simplify the following explanations). Dark circles represent oxygen molecules, and hollow circles represent nitrogen molecules.

Figure 2:
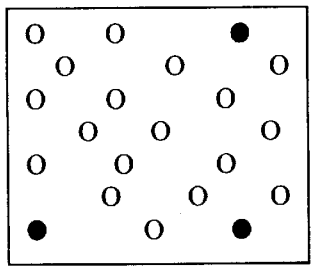
FIG. 2 presents a schematic view of the density of oxygen and nitrogen molecules in a normbaric hypoxic environment with the same partial pressure of oxygen.

FIG. 2 shows the density of molecules in a hypoxic environment with the same partial pressure of oxygen (4.51" or 114.5 mm of mercury), but at a standard atmospheric pressure of 760 mm of mercury.

As can be seen, both environments contain identical amounts of oxygen molecules per specific volume. However, in the second case (shown on FIG. 2) the relative amount of nitrogen molecules versus oxygen molecules is approximately 6:1 to 4:1, respectively.

When the kinetic properties of both gases are compared it is discovered that nitrogen molecules are both slower and less permeable (by a factor of 2.5) than oxygen molecules. This relative increase in the number of inert nitrogen molecules obstructs the kinetic behavior of oxygen molecules. This reduces their ability to support ignition and combustion.

Figure 3:
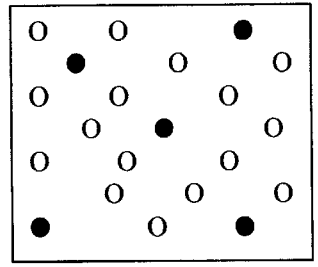
FIG. 3 presents a schematic view of the density of oxygen and nitrogen molecules in a normbaric normoxic environment; or in ambient air at sea level.

FIG. 3 shows that at sea level the oxygen/nitrogen composition in ambient air has a greater partial pressure (159.16 mm of mercury) of oxygen than air found at 9,000' (114.5 mm). It should be noted that ambient air in any portion of the Earth's atmosphere (from sea level to mount Everest) has an oxygen concentration of 20.94%. However, the ambient air found at sea level is under substantially more pressure: Therefore the number of gas molecules per specific volume increases as the distance between the gas molecules is reduced.

"Hypoxic Threshold" and its Physiological Background

During the last decade a substantial amount of data has been accumulated on the physiological effects of hypoxic environments. Extensive laboratory experimentation along with in-depth clinical research has established clear benefits of normbaric, hypoxic air in fitness training, and disease-prevention. Oxygen concentrations in normbaric breathing air (at altitudes up to 2600 m) with the corresponding partial pressure of oxygen have absolutely no harmful side effects on the human body. (Peacock 1998).

This elevation is inhabited by millions of people throughout the world, with no detrimental health effects (Hochachka 1998).

Analysis of data derived from numerous experiments by the inventor has led to the conclusion that under normbaric conditions it is possible to create an artificial environment with breathable hypoxic air that can simultaneously suppress ignition and combustion Multiple experiments were conducted focusing on ignition suppression and flame extinction in a normbaric environment of hypoxic, breathable air. It was found that the ignition of common combustible materials was impossible once the oxygen content dropped below 16.8%. During combustion tests, diffuse flames of various tested materials were completely extinguished when oxygen content fell below 16.2%.

This discovery justifies the creation a new scientific term: "Hypoxic Threshold" which represents the absolute flammability limits of any fuel in an artificial atmosphere with oxygen content of 16.2%. Flame extinction at the Hypoxic Threshold results in the instant elimination of combustion; including an accelerated suppression of glowing. This results in the continued suppression of toxic fumes and aerosols.

These experiments unequivocally prove that a breathable, human-friendly environment, with oxygen content under 16.2%, will completely suppress ignition and combustion.

In terms of partial pressure of oxygen, the Hypoxic Threshold (16.2% O2) corresponds to an altitude of 2200 meters. This is identical to the altitude that is used to pressurize passenger aircraft during routine flights. It has been proven to be completely safe, even for people with chronic diseases such as cardiopulmonary insufficiency (Peacock 1998).

A normbaric environment at Hypoxic Threshold provides a fire-preventive atmosphere that is completely safe for private dwellings, or the workplace. It is scientifically proven that the physiological effects of mild normbaric hypoxia are identical to the effects exhibited at the corresponding natural altitude. Millions of people vacation at these altitudes (2 to 3 km) with no harmful side effects The schematic diagram provided in FIG. 8 contrasts the differing reactions of two oxygen-dependent systems (a flame and a human body) when exposed to a hypoxic environment.

Curve Y represents the decline in combustion intensity (corresponding to the height of a stabile diffusion flame) in relation to the declining oxygen content in a controlled environment. 100% corresponds to the maximum height of a flame at an ambient atmospheric oxygen content of 20.94%. When oxygen content in the controlled atmosphere drops below 18%, a sharp decline in flame height can be observed. At hypoxic threshold X (16.2% O2) the flame and its associated glowing are completely extinguished.

In terms of prevention, the Hypoxic Threshold can be set at 16.8%. This is due to the fact that a diffuse flame receives supplemental oxygen through a combination of convection and free radical production from decomposing fuel—the factors that are not present until post-ignition. However, in order to insure maximum protection each future embodiment will require an environment with oxygen content at or below the "Hypoxic Threshold" (16.2%).

Curve Z illustrates the variance of hemoglobin's oxygen saturation with as it relates to the partial pressure of inspired oxygen. In ambient air (at sea level), average hemoglobin saturation in vivo is 98%. At dynamic equilibrium molecules of oxygen are binding to heme (the active, oxygen-carrying part of hemoglobin molecule) at the same rate oxygen molecules are being released. When the PO2 (partial pressure of oxygen) is increased, the rate that oxygen molecules bind to hemoglobin exceeds the rate at which they are released. When the PO2 decreases, oxygen molecules are released from hemoglobin at a rate that exceeds the rate at which they are bound.

Under normal thermal conditions, the saturation of hemoglobin remains above 90%, even if exposed to an alveolar PO2 of 60 mm Hg (which corresponds to an altitude of 3300 meters or 14% O2 in normbaric hypoxic air). This means that oxygen transport will continue at an acceptable rate despite a significant decrease in the oxygen content of alveolar air.

It is important to note that a partial pressure of the inspired oxygen can only determine the hemoglobin saturation in the alveoli. All the following oxygen transport and metabolism depend only from the balance between the body's cellular demand and the body's vascular delivery capacity. In standard atmospheric conditions the partial pressure of neutral diluting gases has no influence on the metabolism and transport of oxygen.

In contrast, the ability of oxygen molecules to support combustion is substantially impinged as the relative concentration of neutral or inert gases (in this case—nitrogen) increases.

The radically different properties of these oxygen dependent systems is the crucial factor that allows a hypoxic environment at the Hypoxic Threshold to be completely safe for human life, but not support combustion.

Figure 8:
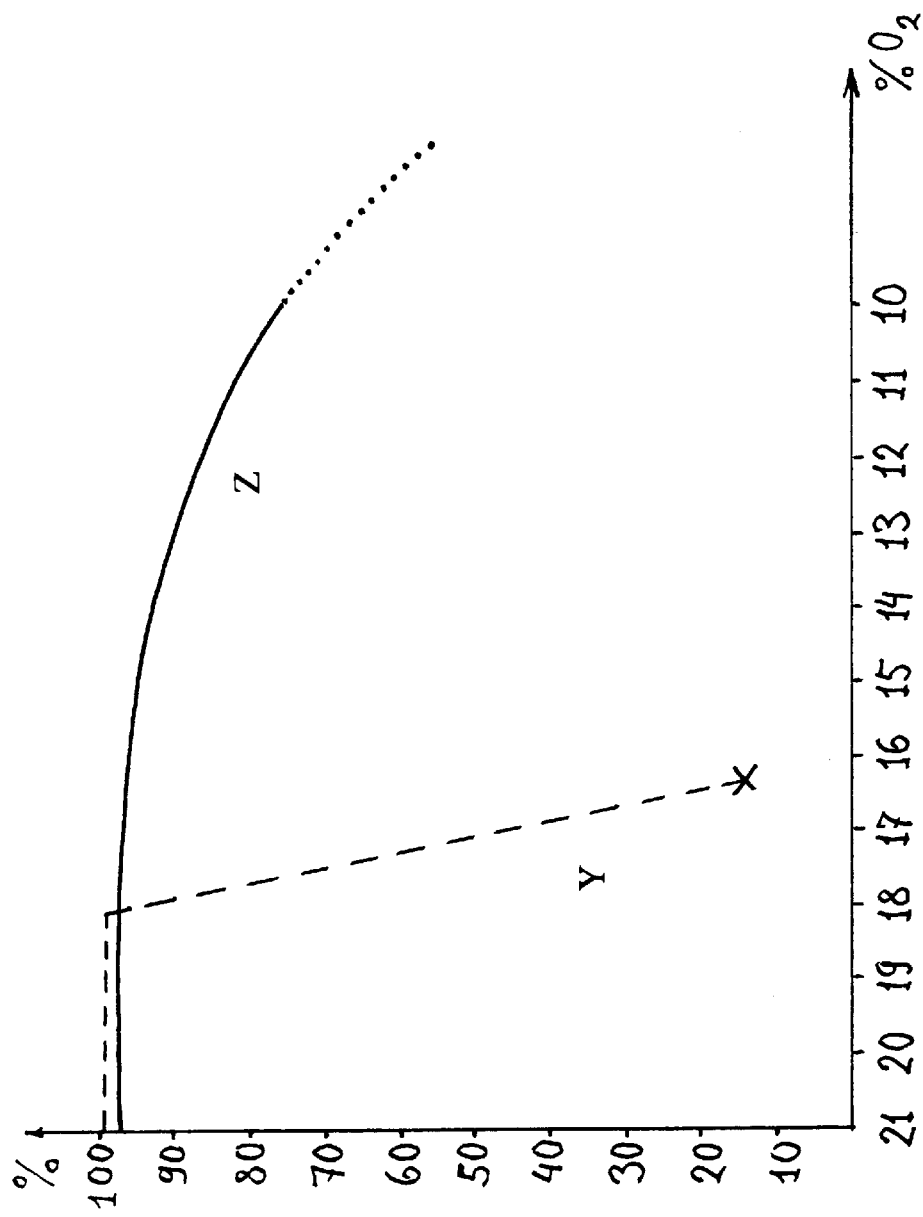
FIG. 8 illustrates the comparison of a flame extinction curve and a hemoglobin/oxygen saturation curve upon the introduction of reduced-oxygen air in a controlled environment.

The diagram presented in FIG. 8 clearly illustrates that the Hypoxic Threshold does not significantly alter the saturation of hemoglobin in vivo. Conversely, the Hypoxic Threshold instantly extinguishes any flame. It should be noted that curve Z represents the hemoglobin saturation curve of an individual who is exposed to hypoxia without previous adaptation. In cases where a hypoxic environment is used proactively (for fire prevention), individuals quickly adapt to the reduced oxygen level and will have normal hemoglobin saturation levels.

Consequently, there is absolutely no risk to people who spend an extended period of time in a hypoxic environment. In fact numerous medical publications describe the significant health benefits associated with long-term exposure to normbaric hypoxia. More information on these studies can be found at Hypoxico Inc's website (www.hypoxico.com).

In addition, further studies indicate that high levels of humidity enhance the capability of a hypoxic environment to suppress combustion. This is due to the fact that fast moving water molecules create a secondary buffer zone that makes oxygen molecules less available to support ignition or combustion.

Figure 4:
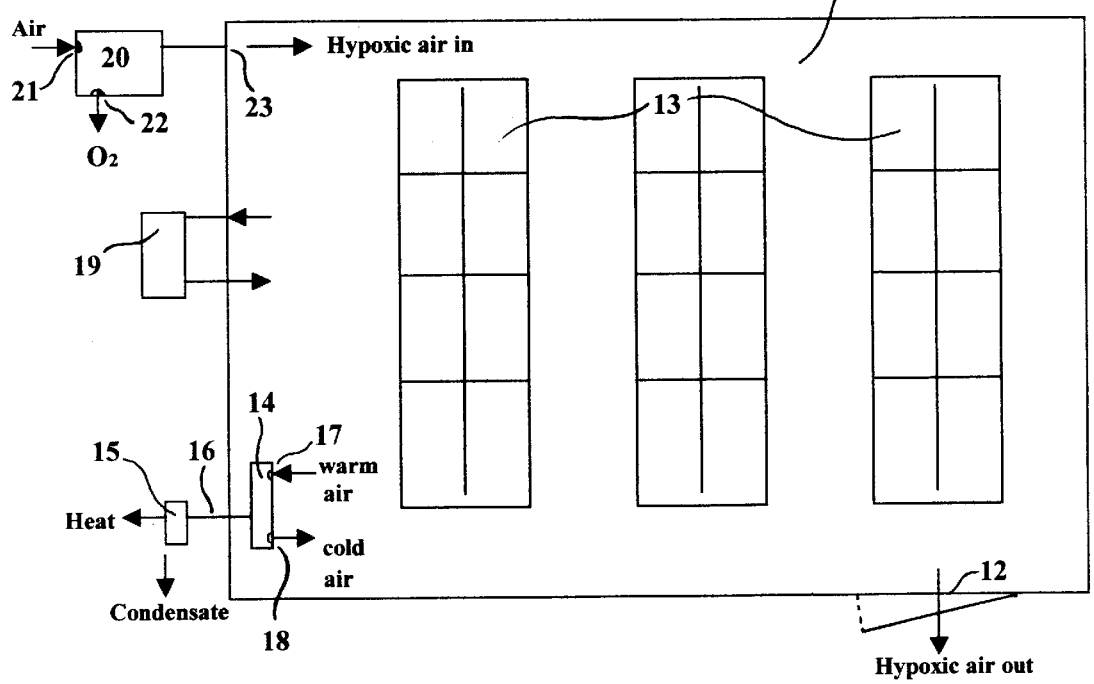
FIG. 4 illustrates schematically a working principle of normbaric hypoxic fire prevention and suppression system.

FIG. 4 shows a schematic view of a fire protected normbaric (or slightly hyperbaric) hypoxic room or enclosure (11) for electronic equipment (e.g. computer equipment) or stored inflammable materials.

FIG. 4 illustrates racks of electronic equipment 13 (or flammable materials) located in a normbaric environment with oxygen concentration at the Hypoxic Threshold. This environment provides absolute fire safety by:

Preventing combustible materials from igniting
Instantly suppressing electrical or chemical fires.

Hypoxic environments with an oxygen content of 17% to 18% can also provide limited protection against combustion. However, it is advisable for public areas (e.g. museums, archives etc.) to maintain an oxygen concentration of 15% to 17%. For human occupied facilities that require superior fire protection an oxygen content of 14% to 15% is recommended. Facilities that require only short periodical human visits may employ environments with oxygen content ranging from 12% to 14%. This corresponds to an altitude of 3 km to 4.5 km (10,000' t 14,500').

The hypoxic air inside the computer room 11 is maintained at approximately 67° F. (18° C.) by a split air-conditioning unit (14) and is connected to an external heat exchanger (15) by a hose 16. Warm air enters the unit 14 through an intake 17, gets chilled, and then exits the unit 14 through an outlet 18. Hot refrigerant and water condensation (from air) are transmitted through a connector hose 16 into an external unit 15. At this point the refrigerant gets chilled, and the condensation is either evaporated or removed. The working principle of a split a/c unit is well known and shall not be described in this patent. A suitable device-PAC/GSR is made by the Italian company DeLonghi. Larger split a/c systems are also readily available. For facilities that do not contain computer equipment air conditioning is not required A Hypoxic generator 20 is installed outside a room 11. The generator 20 takes in ambient air through an intake 21 and extracts oxygen Oxygen-enriched air is then disposed of through outlet 22. The remaining hypoxic gas mixture is transmitted inside the room 11 through the supply outlet 23. Excessive hypoxic air leaves the room 11 through a door 12 in order to equalize the atmospheric pressure inside the room 11 with the outside environment.

The door 12 for personnel entry is not airtight—allowing excess air to the exit room 11. For a 20 cubic meter room, a gap of approximately 5 mm is sufficient for immediate pressure equalization. For some applications it is beneficial to create a slightly hyperbaric environment. This can be easily accomplished by making the room 11 airtight and eliminating gaps around the door 12. Other possibilities are described in previous U.S. Pat. Nos. 5,799,652 and 5,887,439.

The number of hypoxic generators needed for a room 11 depends on a combination of its size and the number of people that occupy it. The generator best suited for a 20-m3 room would be the HYP-100/F. This is currently available from Hypoxico Inc. of New York. The HYP-100/F employs a PSA (pressure-swing adsorption) technology that extracts oxygen from ambient air. This maintenance free unit weighs only 55 lbs (25 kg) and requires only 450W. A nitrogen generator with the same capability would be 3 times heavier and would consume 2–3 times more power. An additional advantage of the hypoxic generator is its ability to increase the humidity of hypoxic air. To avoid accidents, the oxygen concentration setting cannot be changed by the user.

Figure 5:
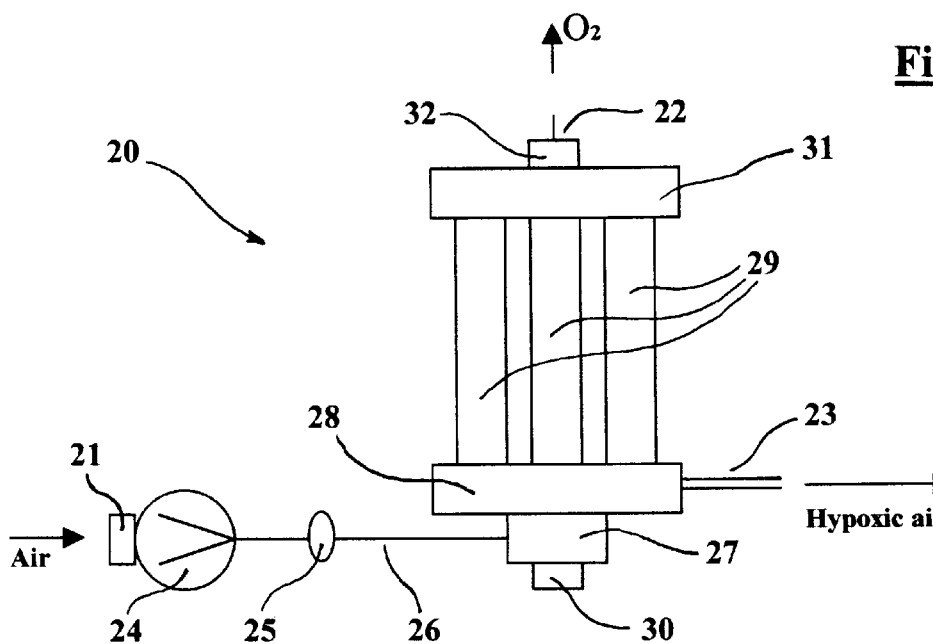
FIG. 5 presents a schematic view of the working principle of hypoxic generator HYP-100/F.

FIG. 5 illustrates the working principle of hypoxic generator 20. The compressor 24 takes in ambient air through an intake filter 21 and pressurizes it up to 18 psi. Compressed air is then chilled in a cooler 25 and is transmitted through a conduit 26 into a distribution valve 27. This is connected to multiple separation containers or molecular sieve beds 29 via a manifold 28. Depending on design needs, these can be installed in a linear or circular fashion. The number of molecular sieve beds may vary from one to 12. HYP-100/F is designed with 12 molecular sieve beds in a circular formation, pressurized in 3 cycles, four beds at a time. This is accomplished by a rotary distribution valve 27. In this particular case a small electric actuator motor 30 drives a rotary valve 27. Both the design, and the working principle of rotary distribution valves, motors and actuators are well known and will not be described further. All of these parts are widely available from valve distributors.

Each molecular sieve bed 29 (or group of beds in case of HYP-100/F) gets pressurized in cycles via a valve 27 that selectively redirects compressed air into each bed. These beds 29 are filled with molecular sieve material (preferably zeolites) that allow oxygen to pass through while adsorbing most other gases; including water vapors (this is important for the end product). Oxygen (or the oxygen-enriched fraction) passing through the zeolites is collected in collector 31 and is released through a release valve 32. It is then disposed into the atmosphere through an outlet 22.

When the zeolites in one of the beds 29 become saturated with oxygen depleted air, the compressed air supply is blocked by a valve 27. This bed then depressurizes, allowing oxygen-depleted air to escape from the zeolites in the bed 29. It is then transmitted through a manifold 28 into a hypoxic air supply conduit 23. This one-way release valve 32 keeps the oxygen-enriched fraction in the collector 31 under minimal pressure (approximately 5 psi). This assures that during the depressurization of the bed 29 sufficient oxygen can reenter. This purges the zeolites that are contaminated with nitrogen and water, thereby enhancing their absorption capacity.

A motorized rotary actuator 30 may be replaced with a linear actuator with a mechanical air distribution valve 27. The motorized actuator 30 may also be replaced by a set of solenoid, or electrically operated air valves 27. However, this will require the addition of a circuit board, making the generator 20 more costly and less reliable. Solenoid valves, mechanical valves, electric valves and linear actuators are widely available and will not be described further.

Figure 6:
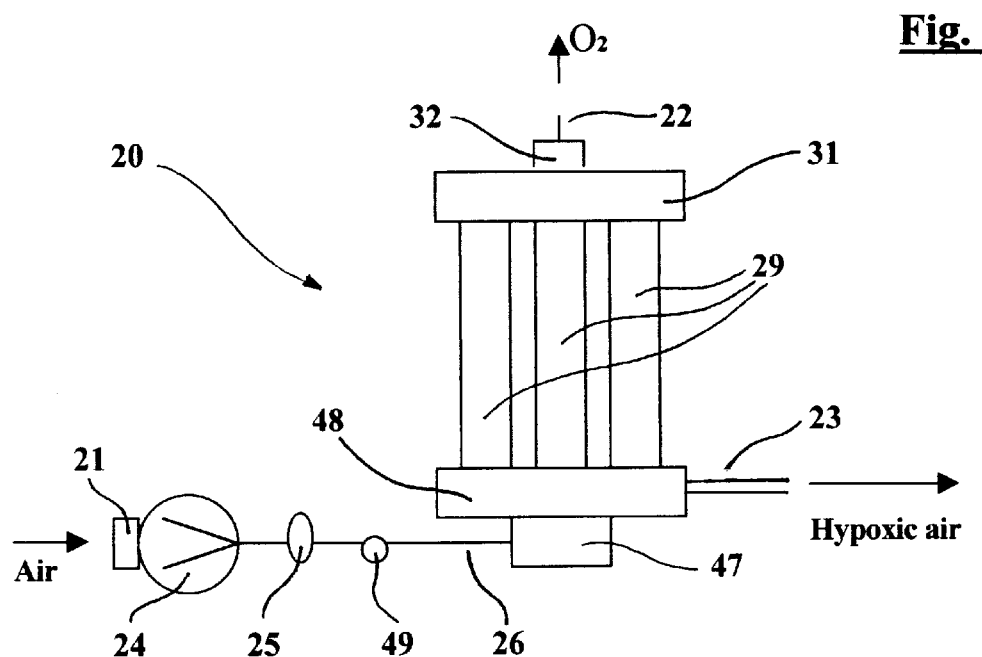
FIG. 6 provides future modification of the same generator shown on FIG. 5.

FIG. 6 shows a hypoxic generator 40, which is available from Hypoxico Inc. This model works on compressed air provided by a compressor 24 and does not require additional electric motors, switches or circuit boards. In this case the distribution valve 47 is comprised of one or more air-piloted valves mounted on a manifold 48. Air-piloted valves are driven by compressed air and do not require additional support. The compressed is cleaned by a long-life HEPA filter 49 available from Hypoxico Inc. Suitable air-piloted valves are available from Humphrey Products in Kalamazoo, Mich., U.S.A. Numerous combinations can be employed in distribution valve 47 in order to distribute compressed air in a cyclical manner. A suitable valve can be selected from this group, which includes electrical, mechanical, air piloted, or solenoid valves. Both linear and rotary configurations are available with actuators controlled by pressure, mechanical springs, motors or timers. It is not possible to cover all potential air distribution solutions in this patent. The number of molecular sieve beds in this model may vary from 1 to 12 (or more).

HYP-100/F provides hypoxic air with 15% oxygen at the rate of 100 liters per minute (different settings from 10% to 18% are available and must be preset at the factory). The HYP-100/F is tamper resistant, as an unauthorized individual cannot change the oxygen setting. Larger size generators up to 1200 L/min are also available from Hypoxico Inc.

The hypoxic generator 20 supplies hypoxic air with approximately 15% greater humidity than the surrounding ambient air. In mild climates, this increased level humidity along with the appropriate temperature provides a perfect environment for computers. In drier climates, or when a nitrogen generator is used in place of a hypoxic generator 20, it is advisable to install a humidifier 19 (optional in other cases) to maintain the room at approximately 40% relative humidity. Any humidifier that is certified for public use is acceptable.

Multiple generators 20 can be placed in a special generator room with its own a/c system and a fresh air supply above 500 ft$^3$/h (14 m$^3$/hour) per each HYP-100/F generator. This is convenient for larger facilities with multiple rooms 11. In this case, larger air-conditioning units working in the recycle mode should be installed. Hypoxic generators will provide sufficient ventilation and fresh air supply. Every hypoxic generator is equipped with a HEPA (high efficiency particulate arrestance) filter that provides almost sterile air. In addition this "clean environment" is also beneficial for fire prevention as they substantially reduce dust accumulations on computer equipment.

Room 11 may also represent a computer cabinet 13. In this case, hypoxic air supplied by a miniature size generator 20 is chilled by a small heat exchange module 14 (both will be available from Hypoxico Inc.).

Any oxygen extraction device, such as a nitrogen generator or an oxygen concentrator can be used instead of a hypoxic generator 20. However, this will create significant disadvantages. PSA (pressure-swing adsorption) and membrane separation nitrogen generators require much higher pressures. The result of this is a less power efficient unit that is heavier, noisier, and costlier to maintain. Moreover, nitrogen generators create an extremely arid product that would require extensive humidification. Other oxygen extraction technologies, such as temperature-swing or electrical current swing absorption, may also be employed in the oxygen extraction device 20. Most of these technologies rely on the use of a pump as an air separation module. The design and working principle of such air separation modules (employing both molecular-sieve adsorption and membrane separation technologies) is well known and widely available.

Figure 7:
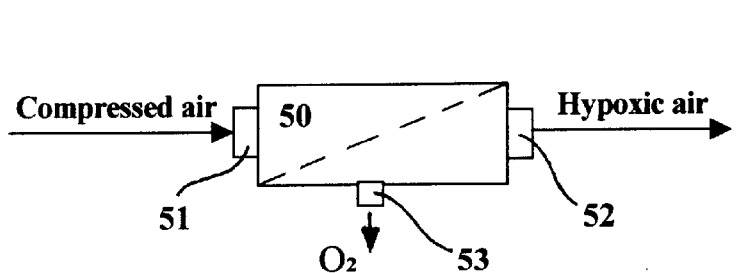
FIG. 7 illustrates a working principle of a membrane separation module.

FIG. 7 shows a schematic view of a nitrogen generator or oxygen concentrator employing an oxygen-enrichment membrane module 50. Extracted oxygen is disposed of through an outlet 53. Dry compressed air is delivered via an inlet 51 into a hollow-fiber membrane module 50. Fast moving oxygen molecules under pressure diffuse through the walls of hollow fibers and exit through the outlet 53. Dry nitrogen or a nitrogen enriched gas mixture passes through the hollow fibers and is transmitted through an outlet 51 into the room 11. The employment of this technology in the Hypoxic FirePASS system would require additional humidification of the room's 11 environment Both, nitrogen generators and oxygen concentrators require sophisticated computerized monitoring equipment to control and monitor oxygen levels. This makes them unsafe for human occupied facilities.

The principle of a normbaric hypoxic environment for fire prevention and suppression could be applied to any room. Enclosures of any shape and size including buildings, marine vessels, cargo containers, airliners, space vehicles/space station, computer rooms, private homes, and most other industrial and non-industrial facilities will benefit from a fire-preventative hypoxic environment.

In a large computer facility, each rack with computer equipment 13 may be enclosed in its own hypoxic room 11. This energy sparing strategy will provide a normoxic environment between the racks 13. In addition, it will not interfere with a facility's current fire suppression system Moreover, the facility may use a much cheaper sprinkler system, as water will not be able to damage computer equipment that is enclosed inside a hypoxic room's watertight panel enclosures. Hypoxico Inc. in New York manufactures suitable modular panel enclosures of any size. In this case, air-conditioning for each enclosure becomes optional as the facility might already be sufficiently chilled.

FIG. 8 illustrates a comparison of flame extinction curve Y and hemoglobin saturation curve Z in a controlled atmosphere during the gradual reduction of oxygen (This has been explained earlier).

Figure 9:
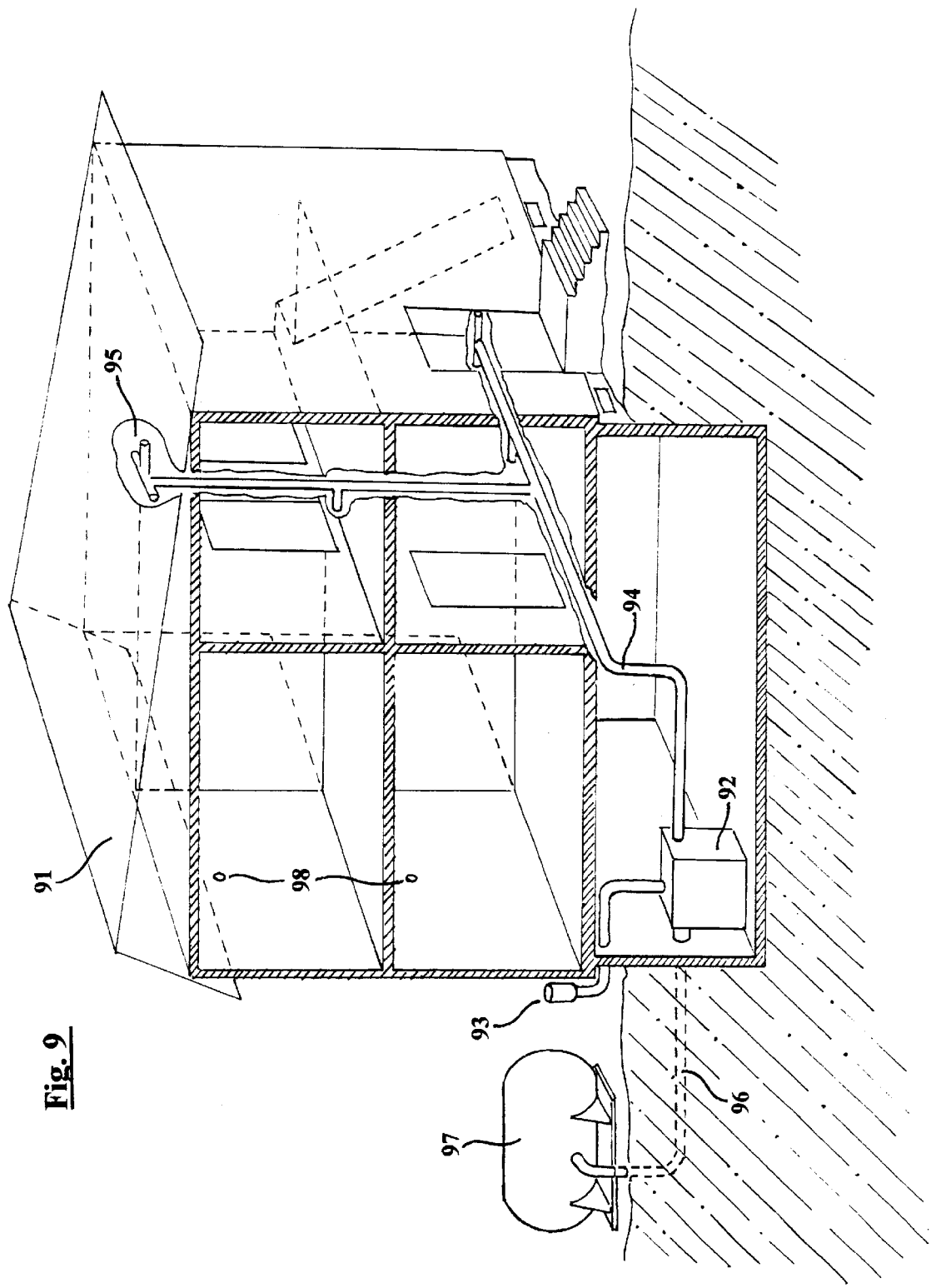
FIG. 9 shows a schematic view of the invented system for house dwellings.

FIG. 9 shows a schematic view of a private home with a dual mode modification of the FirePASS system. The system can be set in the preventative mode or the suppressive mode.

A house 91 having installed the Home FirePASS system will include a hypoxic generator 92 with an outside air intake 93 and distribution piping 94. Discharge nozzles 95 will be located in every room.

This type of hypoxic generator 92 incorporates an additional compressor (not shown) that allows hypoxic air to be stored and maintained in a high-pressure storage container 97, via pipe 96.

Hypoxic air used in fire-preventive mode should have oxygen content of approximately 16%. In the suppressive mode the oxygen content in the internal atmosphere (after the deployment of the FirePASS) should be between 12% and 14%.

Smoke and fire detectors 98 installed in the home will initiate the Home FirePASS in the suppressive mode (in the prevention mode fire ignition is impossible). All detection and control equipment is available on the market and will not be described further.

The storage container 97 can contain hypoxic air under a pressure of approximately 100 bar (or higher), when a smaller tank is desired. The container 97 should be installed outside of the home 91, preferably in protective housing. High-pressure gas storage containers and compressors are readily available in the market. The hypoxic generator 92 for the Home FirePASS is available from Hypoxico Inc.

The working principle of the system can be described as follows. The hypoxic generator 92 draws in fresh outside air the through the intake 93, and supplies hypoxic air into a high-pressure pressure container 97 through a built-in compressor. Recommended storage pressure in the tank is approximately 100 bar.

The system has two operating modes: preventative mode and suppressing mode. When the home is left uninhabited (during working hours or vacations), a fire-preventive mode is initiated by pressing a button on the main control panel (not shown). This initiates the system by starting the hypoxic generator and allowing the slow release of hypoxic air from the container 97 into the distribution piping 94. Nozzles 95 are located in every room in the house. Consequently, a fire-preventive environment (with an oxygen content of 16%) can be established in approximately 15 minutes. In addition, a hypoxic environment can be created with an oxygen concentration below 10%. This is a very effective deterrent against intruders, as it is an extremely uncomfortable environment to be in. When people return home, they can quickly establish a normoxic atmosphere by opening windows or using a ventilating system (not shown). When the fire-preventive environment is created, the generator 92 will refill the container 97 with hypoxic air.

If desired, a hypoxic atmosphere can be permanently established, making the container 97 obsolete. In the preventive mode, the generator 92 of the Home FirePASS will constantly provide a human friendly normbaric hypoxic environment with oxygen content of 16%. This corresponds to an altitude of 2200 m above sea level. This atmosphere provides a number of health benefits (described on www.hypoxico.com) and excludes the possibility of combustion (even smoking inside house 91 will be impossible). For cooking purposes, electric appliances must be used. Household heating appliances that run on gas or liquid fuel can be made operational by installing an air supply duct that allows outside air to be drawn for combustion.

The system's fire suppression mode is tied directly to smoke or thermal detectors 98, installed in each room of the house. A signal from a smoke detector 98 is transmitted to the main control panel which opens an automatic release valve (not shown). This results in the rapid introduction of the hypoxic gas mixture from the container 97. Release nozzles 95 can be equipped with small air-powered sirens that are activated upon the release of hypoxic air. It is recommended that hypoxic gas should be released into all rooms simultaneously.

However, in order to reduce the size of container 97, the release of hypoxic air can be limited to the room in which smoke was detected. Given FirePASS's reaction time of less than one second, this should be more than sufficient to suppress a localized fire.

To reduce costs, the Home FirePASS can operate in suppression mode without the installation of generator 92. In this case the system will consist of a high-pressure tank 97, gas delivery piping 94 and a detection and control system 98. A local service company can provide the requisite maintenance and refilling of the gas storage tanks 97.

Figure 10:
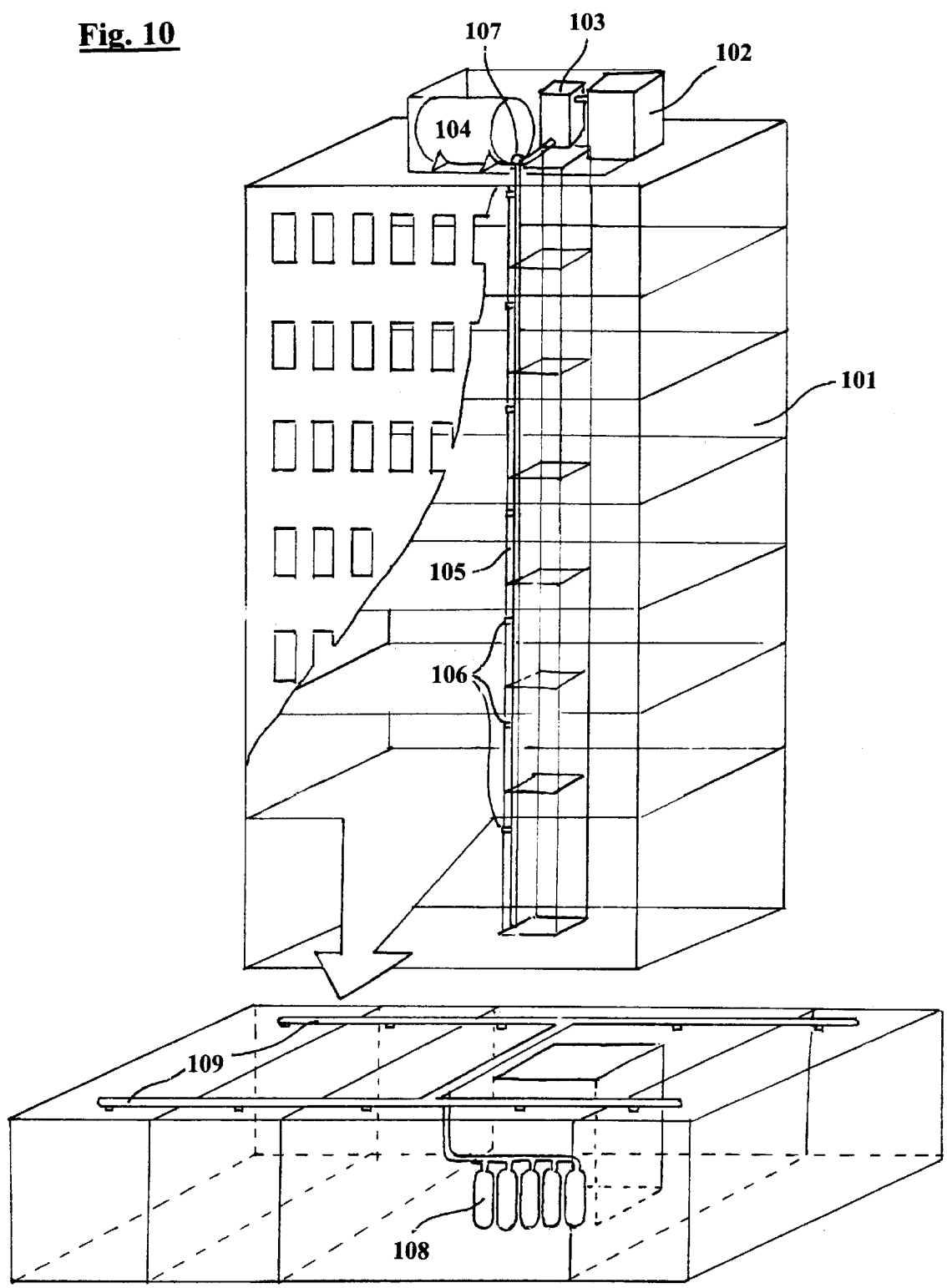
FIG. 10 presents a schematic view of the invented system for multilevel buildings.

FIG. 10 is a schematic view of a multilevel building 101 with the Building FirePASS installed in suppressive mode.

A larger FirePASS block (available from Hypoxico inc.) installed on the roof of the building 101 has a hypoxic generator 102 providing hypoxic air through the extraction of oxygen from ambient air. The generator 102 communicates with a compressor 103, delivering hypoxic air at high pressure to the storage container 104. Once there, it is maintained under a constant pressure of approximately 200 bar (or higher).

As shown in FIG. 10, a vertical gas delivery pipe 105 having discharge nozzles 106 on each floor can be installed throughout the entire building, either externally or in an elevator shaft. Discharge nozzles 106 are installed with silencers to reduce the noise created by the release of high-pressure gas.

When fire is detected, a signal from a central control panel initiates the opening of a release valve 107 forcing stored hypoxic air into the distribution pipe 105. Given the FirePASS's rapid response time, the creation of a fire-suppressive environment on the affected floor should be sufficient. However, as an added precaution, hypoxic air should be released to the adjacent floors. The Building FirePASS will release sufficient hypoxic air (with oxygen content of approximately 15%). to the desired floors.

The positive pressure of the hypoxic atmosphere will guarantee its penetration into all apartments and will instantly suppress a fire in any room. In addition, by establishing a hypoxic environment on the adjacent floors, a fire will be unable to spread to the upper portion of the building. A key advantage of this system is that it can be incorporated into the fire-sensing/fire-extinguishing equipment that is currently in place (such as employed by a sprinkler system, gas-suppression system, etc.)

Separate floors may have an individual fire detection system connected to an individual Floor FirePASS, as shown on the bottom of FIG. 10. High-pressure hypoxic gas containers 108 can release hypoxic air throughout the floor via distribution piping 109 with discharge nozzles in each room. In order to reduce the storage pressure and the size of container, a very low oxygen concentration may be used in the stored gas, provided that a safe breathable atmosphere will be established in each room with oxygen content of about 15%. Freestanding fire-extinguishing units can be used in. selected rooms in the building. Such units are described later in connection to FIG. 12.

Figure 11:
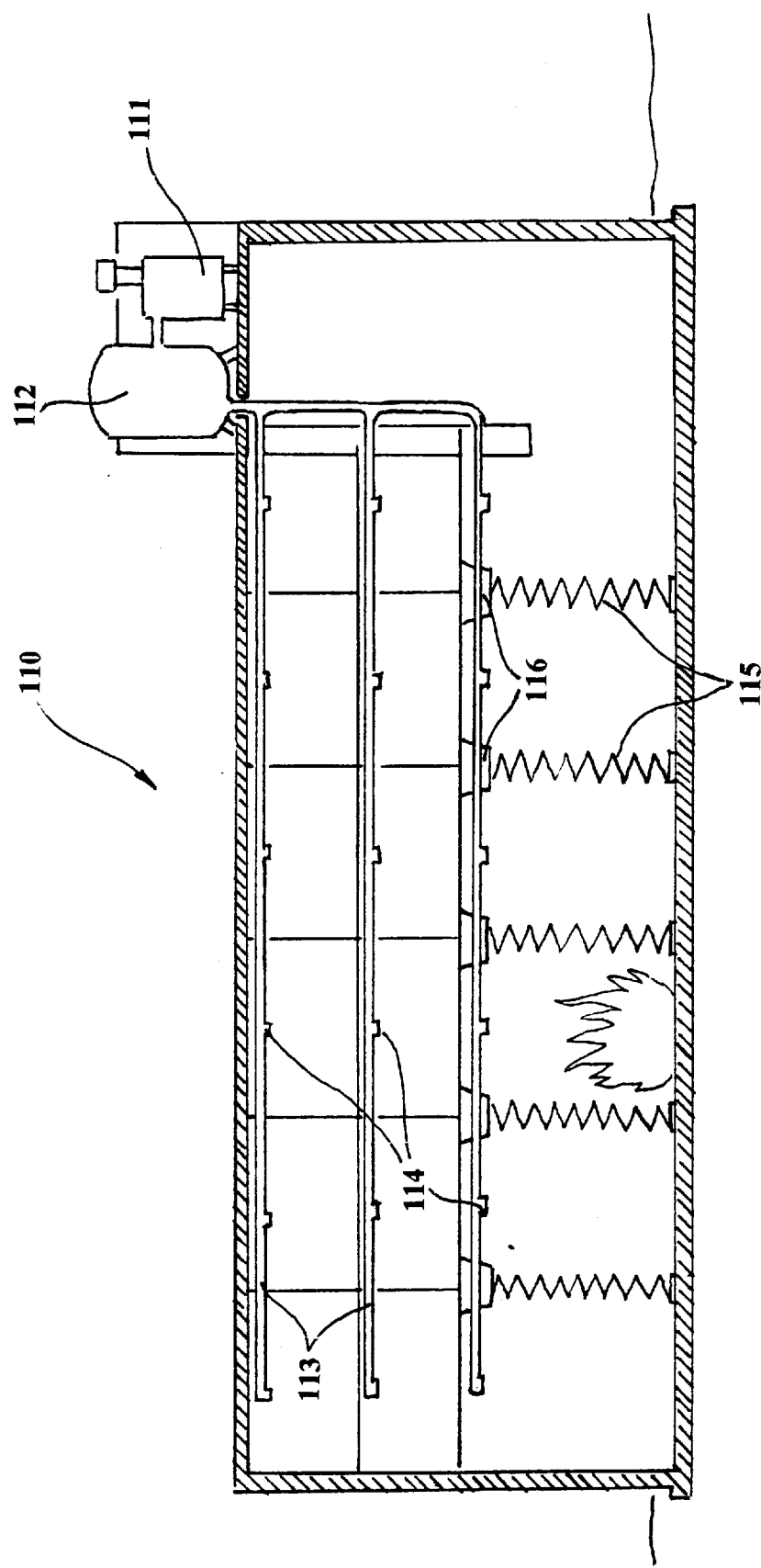
FIG. 11 shows a schematic view of the invented system for industrial buildings.

FIG. 11 presents a schematic view of an industrial building 110. The ground floor has no separating walls and can be open to the outside atmosphere, e.g. for unloading, etc. In this case, FirePASS should include separating partitions, or curtains 115, that can be dropped down in case of fire.

The Hypoxic generator/compressor block 111 and gas storage container 112 are installed on the roof or outside of the building 110. The Building FirePASS delivers hypoxic air through distribution piping 113 and discharge nozzles 114. In the case of a localized fire (in a room or on an upper floor), the FirePass will instantly discharge hypoxic air in an amount that is sufficient to establish the Hypoxic Threshold, but comfortable enough for human breathing (14–15% recommended, or 10–14% for some applications).

When smoke and/or fire are detected on the ground floor, curtains 115 (which are stored in curtain holders 116) are released thereby separating the floor into localized areas. This will block the ventilation and movement of air. When fire is detected, the building's ventilation system should be immediately shut down. Hypoxic air is then instantly released into the affected area (and the adjacent area), causing the fire to be rapidly extinguished.

Curtains 115 should be made from a fire-resistant synthetic material that is soft and clear. Vertical flaps of the curtains 115 will allow for the quick exit of people who are trapped in the affected area.

FirePASS system can establish a hypoxic environment below Hypoxic Threshold on a specific floor or throughout an entire building. If required, this fully breathable, fire-suppressive atmosphere can be maintained indefinitely, providing a lifeline to people that are trapped inside. This embodiment is suitable for providing fire-preventive and fire-suppressive environments for numerous applications.

For example, nuclear power plants could be maintained in a fire-preventive state. If an accident does occur, than the oxygen content should be reduced to approximately 10%. This extreme hypoxic environment is still safe for a minimum of 20 minutes, giving trapped people time to escape. When lower oxygen concentrations are used, breathing can be further stimulated by adding carbon dioxide to the gas mixture.

Both Home FirePASS, and Building FirePASS, can be installed in a strictly preventive mode. In this case, storage containers 97, 104 and 112 become optional, as the generator will be constantly pumping hypoxic air into the distribution piping. This creates a permanent fire-preventative environment.

Figure 12:
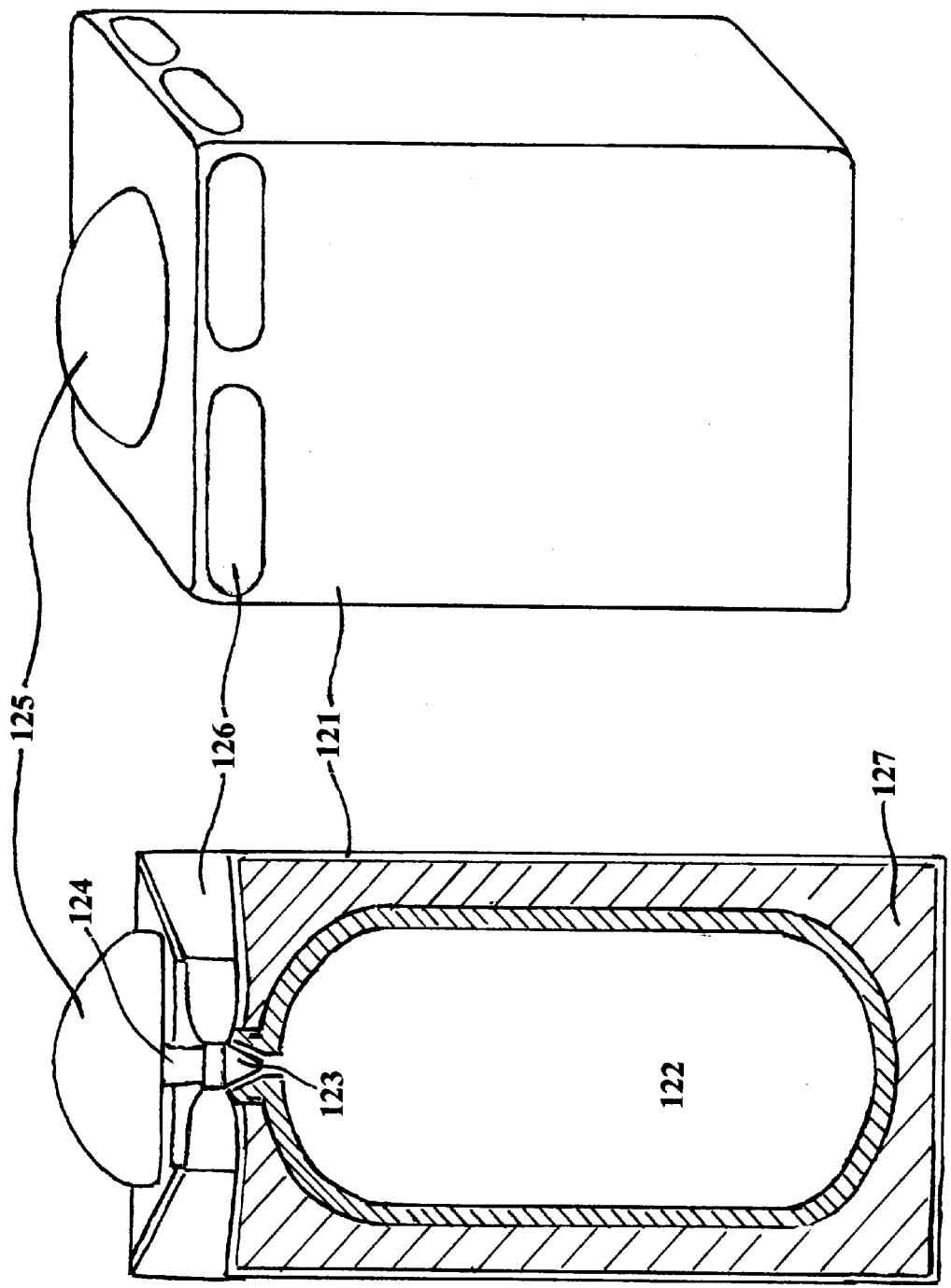
FIG. 12 presents schematic view of a portable fire-suppression system for selected rooms in any type of building.

Another cost effective solution would be to provide each room with its own automatic fire suppression apparatus. FIG. 12 shows a freestanding fire-extinguishing unit 121 having a gas storage container 122 inside. A release valve 123 (preferably burst disk type) can be opened by an electro-explosive initiator 124 that is initiated by a thermal/smoke-detecting device on the control block 125. When smoke or fire is detected, a signal from the control block 125 actuates the initiator 124. This causes the valve 123 to open and release the hypoxic composition through discharge nozzles 126 in each room. An extended-life battery, with an optional AC power connection can power the control block 125.

Storage container 122 contains the appropriate quantity of hypoxic air (or nitrogen) under high pressure. When released, it will provide a fire-suppressive atmosphere at or slightly below the Hypoxic Threshold. The amount of hypoxic fire-suppressive agent in the container 122 can be easily adjusted for each room by changing the gas storage pressure.

Carbon dioxide can be added to the fire-suppressive agent in quantities up to 30%, thereby replacing the corresponding part of nitrogen. This will stimulate the breathing process if the hypoxic atmosphere having an oxygen content below 14%.

The container 122 is surrounded by protective filling 127 that cushions it against impact and provides it with thermal protection. Discharge nozzles 126 are equipped with silencers or noise traps in order to reduce the noise from discharging gas.

Units 121 can be temporarily installed and are an excellent alternative to costly fire suppression systems that require permanent installation.

Figure 13:
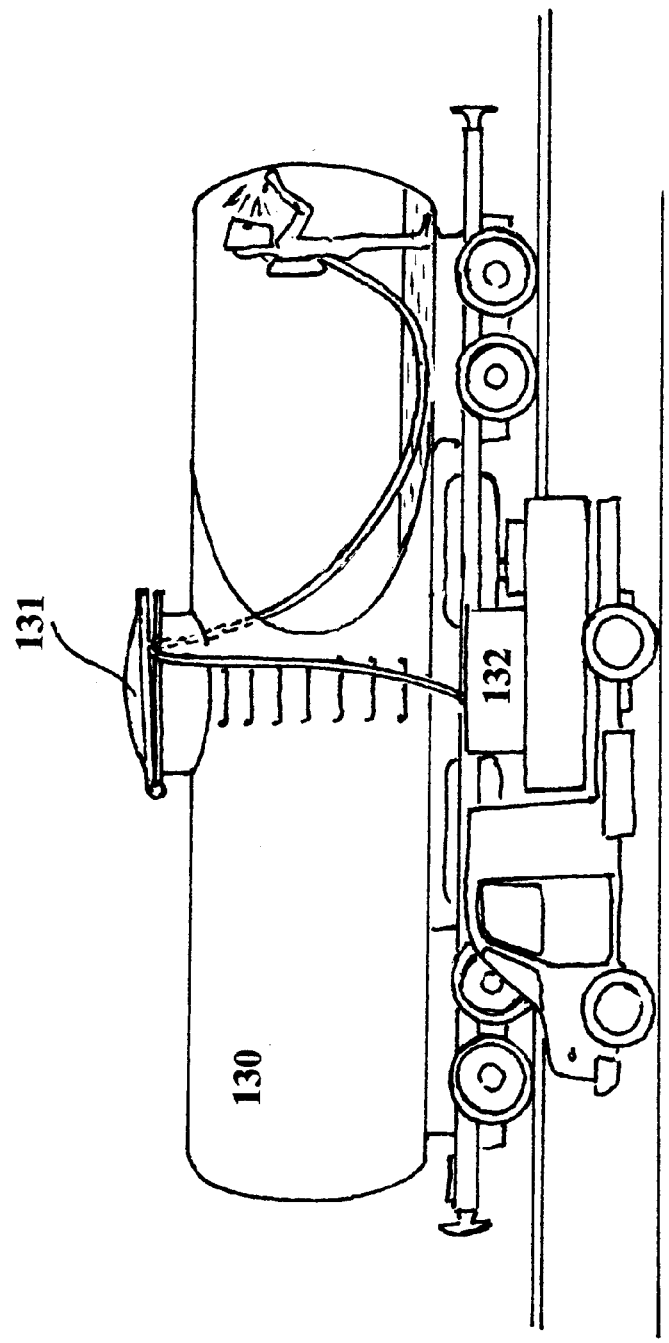
FIG. 13 illustrates the unique properties of the invented system in mobile modification.

FIG. 13 demonstrates the unique abilities of a mobile FirePASS system for industrial applications. For example, a broken tank or vessel 130 having a hatch 131 can be welded in a hypoxic environment. This is not feasible using current suppression systems as an empty container may still contain explosive vapors.

A Mobile FirePASS unit 132, producing approximately 2 cubic meters of hypoxic air per minute would quickly reduce the tank's 130 oxygen content to 14%. This hypoxic composition will be heavier than the explosive vapors in the ambient air. Consequently, it will act like a blanket, covering the surface of the inflammable liquid. Therefore a completely safe working environment will be created inside the tank 130. Lower oxygen concentrations can be used if the welder has a dedicated breathing supply. In this case, the welder will expire air with an oxygen content of approximately 16.5%. This level is close to the hypoxic threshold and will not negatively influence the surrounding environment.

In this environment all types of cutting or welding can be safely employed, including electric welding and oxygen-acetylene torches. Even if a spark, or molten metal touches the kerosene, ignition will not occur.

Similar mobile FirePASS units can be used in numerous applications where repair work must be done in an explosive or fire hazardous environment, e.g. inside a sea tanker, an underground gasoline vessel, a crude oil pipe etc.

Figure 14:
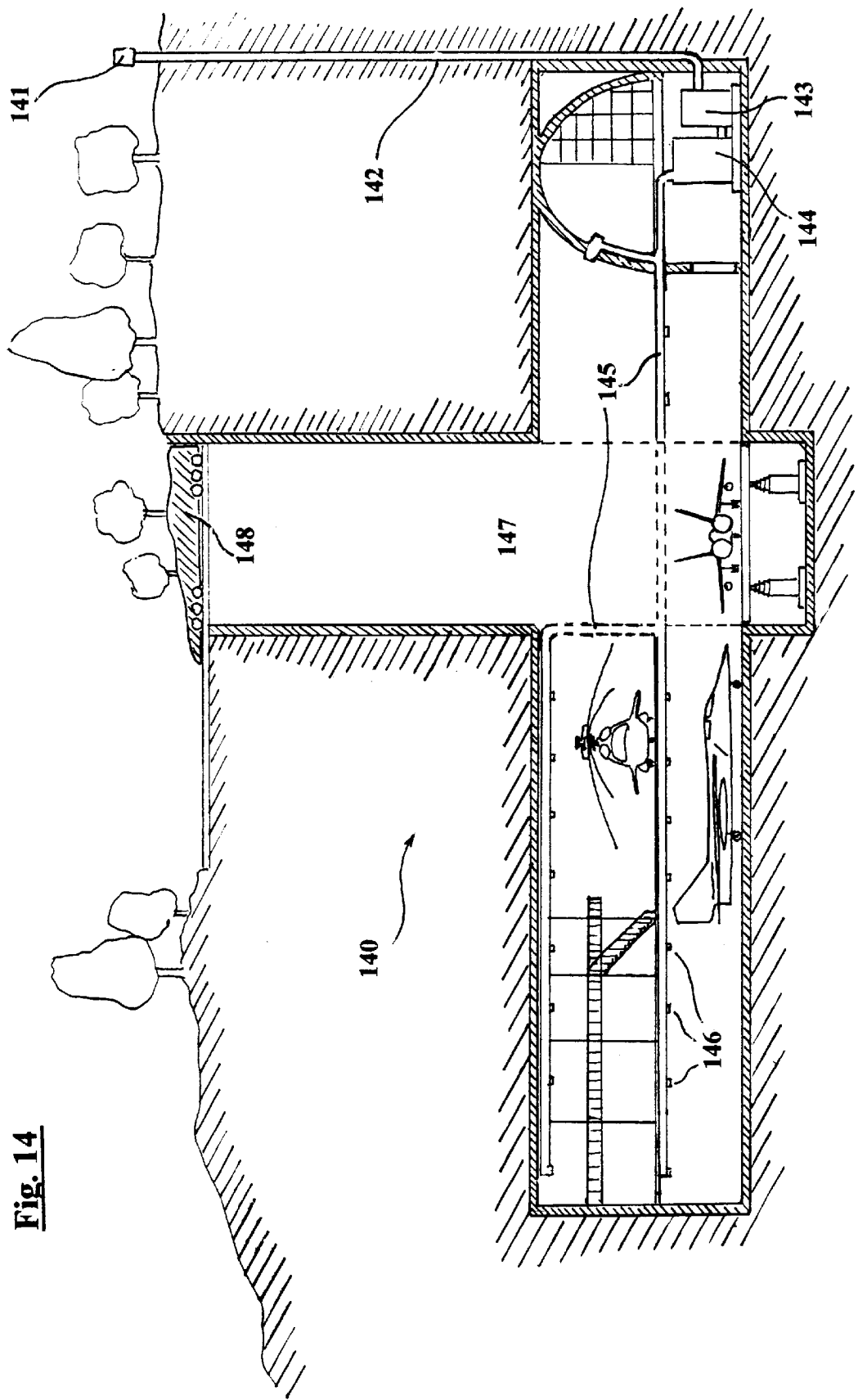
FIG. 14 presents a schematic view of the invented system when implemented into the ventilation system of an underground military facility.

FIG. 14 presents a schematic view of an underground military installation 140 being maintained in a constant hypoxic environment. This is provided by a special FirePASS system. Ambient air is taken in via a ventilation intake 141, which is installed at a remote location. It is then delivered through a ventilation shaft 142 into the hypoxic generator module 143. An upstream side-filtering unit 144 purifies the air, eliminating chemical and bacteriological contaminants.

Hypoxic air having an oxygen content of approximately 15% is delivered from a generator 143 into ventilation ducts 145 with openings 146 evenly distributed throughout the facility 140. This provides each room with a self-contained breathable atmosphere at a slightly positive barometric pressure. Excessive hypoxic gas exits the underground facility 140 via an elevator shaft 147 with a protected one-way ventilation opening on top (not shown). When the exit cover 148 of the shaft 147 slides open, the positive pressure and higher density of the hypoxic air prevents outside air from rushing in, which provides additional important feature of the system. This fire-preventive atmosphere provides additional protection from an explosion (e.g. from a penetrating bomb or internal accident) by stopping fire from propagate inside the facility.

Figure 15:
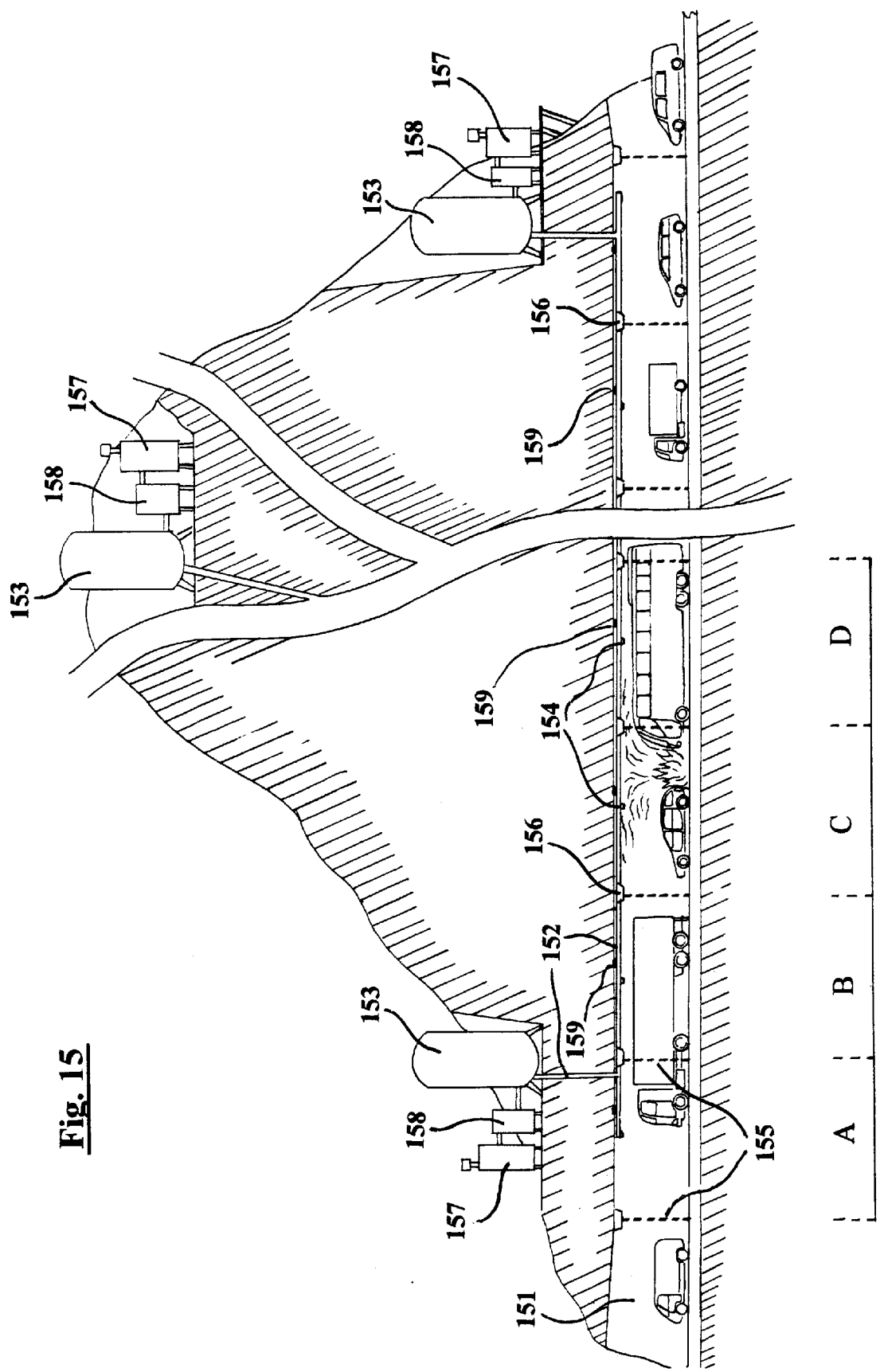
FIG. 15 presents a schematic view of the system's working principle in an automobile tunnel.

FIG. 15 presents a schematic view of the Tunnel Fire-PASS system for automobile tunnels. This fire suppression system is self-adjustable and fully automatic.

A high-pressure pipe 152 runs throughout the length of the tunnel 151. It can be installed alongside a wall 151 or below the ceiling. The pipe 152 is connected to a high-pressure container 153 outside the tunnel 151. The result of this configuration is a fully enclosed high-pressure gas circuit 152–153. For longer tunnels it is advisable to have separate systems on each end. Additional systems can be added, if necessary. For example, a 25 km tunnel recently opened in Norway would require at least 10 additional FirePASS units installed throughout its length.

Gas discharge nozzles 154 are distributed evenly throughout the full length of the tunnel. Each nozzle 154 services a separate section of the tunnel, e.g. A, B, C, etc. A ventilation system of the tunnel is not shown on this drawing in order to simplify this presentation. In case of a fire, each sector can be separated with soft flap curtains 155, held normally in curtain-holders 156

A Hypoxic generator 157 is installed outside the tunnel and communicates with a high-pressure vessel 153 through the compressor block 158. High-pressure container 153 and a pipe 152 contain breathable hypoxic air with an oxygen content ranging from 12% to 15%. Generated by the hypoxic generator 157 and delivered into a container 153 via the compressor block 158, this air is at a barometric pressure of approximately 200–300 bar. Longer tunnels require the installation of multiple Tunnel FirePASS units as shown in FIG. 15.

The working principle of this embodiment can be explained as follows. If a fire occurs in section C it will be immediately detected by heat/smoke detectors 159 which are distributed at 5-meter intervals throughout the tunnel. The curtain holders 156 located between sections A. B, C, D and E will release flexible, transparent curtains. This will separate the fire in section C from the rest of the tunnel.

Figure 16:
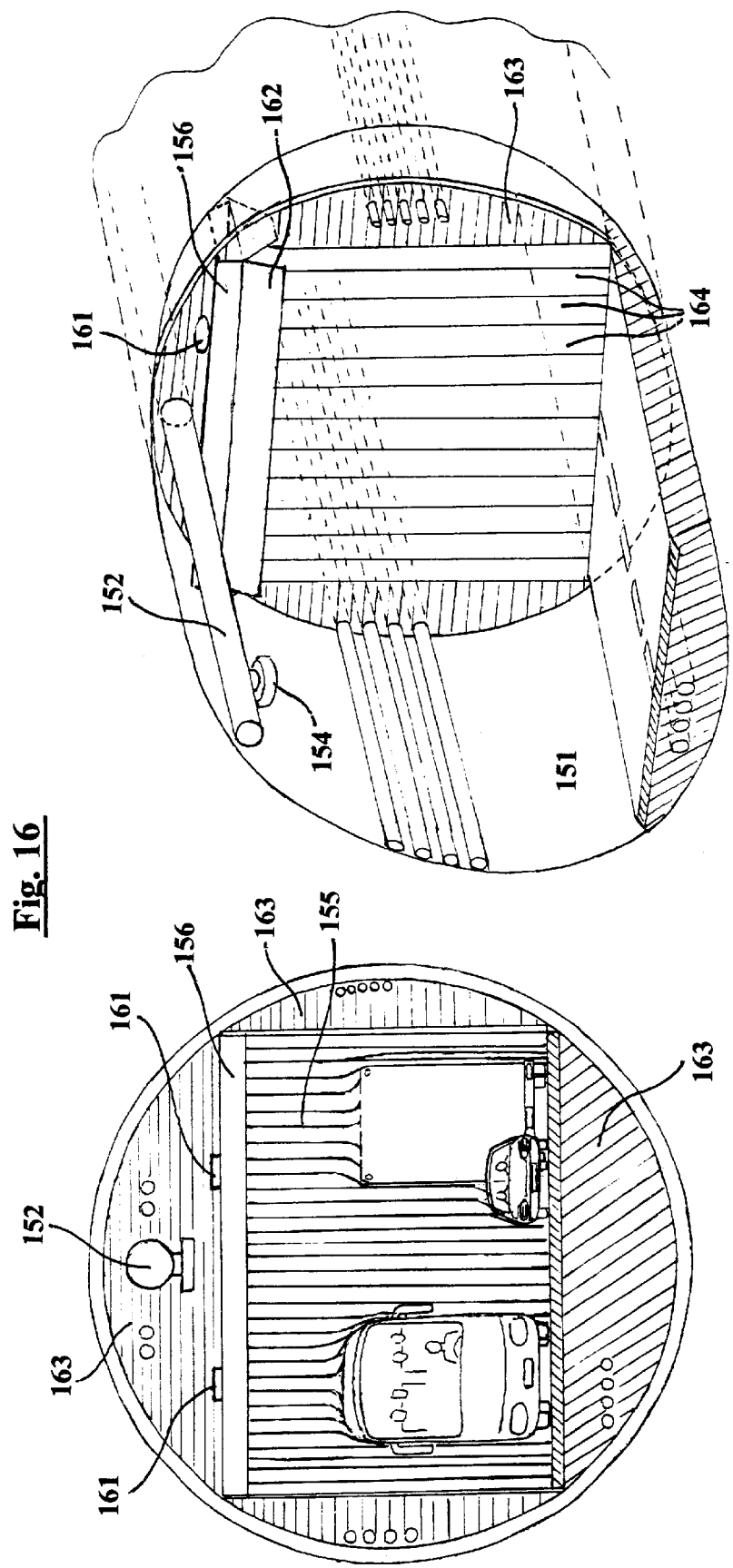
FIG. 16 presents a schematic cross-sectional view of a tunnel with a localizing curtain-deployment system.

As shown in FIG. 16, the curtains 155 will be made from a synthetic material and have soft transparent flaps. These curtains 155 can be instantly inflated by a high-pressure gas cartridge or a pyrotechnic cartridge 161. These cartridges will be similar to those used in inflatable automobile bags. The cartridge will be initiated by a signal from the smoke/fire detectors 159. Suitable detection equipment is available from numerous manufacturers.

Simultaneously, the tunnels internal ventilation system will shut down and a discharge nozzle 154 in section C will release hypoxic air under high pressure. This hypoxic air is stored in the pipe 152 and the container 153. The volume of hypoxic air released into section C will exceed the volume of section C by several times. Therefore, sections B, C and D will undergo complete air exchange, ensuring the quick establishment of a fire suppressive environment. In shorter tunnels (under 1000 m) the volume of hypoxic air should be sufficient to fill the entire tunnel.

To calculate the amount of the hypoxic fire-extinguishing composition that needs to be released from the circuit 152–153 into sections B, C and D, a final concentration of 13% to 15% oxygen should be used in the atmosphere where it should be released. This corresponds to an altitude between 2700 and 3800 meters, which is still suitable for human breathing. This hypoxic environment will instantly suppress any fire: This includes chemical fires, electrical fires, fires induced by inflammable liquids and fires from gas detonations. In addition, this environment will instantly suppress a fire from an explosion. This provides significant protection against a terrorist attack.

Nozzles 154 are equipped with special silencers to reduce the noise resulting from the high-pressure gas release. To alarm people both inside and outside the tunnel, it is also recommended that air sirens be attached to the silencers. In addition, as the oxygen content drops below Hypoxic Threshold, the combustion engines of the trapped automobiles will become inoperable. Consequently, there will be sufficient breathable air for many hours.

Gas release from the nozzles 154 is initiated by a signal from an automated system of fire detectors 159. It is recommended that the volume of hypoxic air in the system 152–153 be sufficient to fill the entire tunnel. If this is not feasible, then the volume should be great enough to fill the affected section and those adjacent to it.

In some applications the pipe 152 can be kept at standard pressure, thereby reducing its weight. This can be accomplished by keeping the high-pressure hypoxic air strictly in the vessel 153. It is then released into the pipe 152 in case of fire. Consequently, a lighter and less expensive discharge mechanism at nozzles 154 can be used. However, this requires the installation of a computerized fire detection and gas release system that automatically opens the release valve from the vessel 153 and feeds the hypoxic air into the pipe 152, which is then released through the nozzle 154 into the required sections.

If a fire breaks inside the tunnel then localizing drop curtains 155 would be released throughout the entire tunnel (preferably every 50 to 100 meters). This will establish fire-suppressive hypoxic environment throughout the tunnel and prevent any ventilation. In addition, accidents will be avoided as the hypoxic environment prevents combustion in automobile engines.

After the appropriate personnel declare the tunnel safe, the nozzles 154 will be closed and the curtains 155 will be retracted into the curtain holders 156. The ventilation system of the tunnel 151 will then be reopened, bringing in fresh air.

The oxygen content inside the tunnel will rapidly increase to 20.9% (the normal ambient concentration), allowing combustion engines to resume normal operations.

Pressure monitoring transducers installed at the vessel 153 will turn on the hypoxic generator 157 and the compressor block 158 if pressure drops, which may occur during maintenance or fire emergency. This automatic refill ensures that the system will always be ready to suppress a fire.

The Hypoxic generator 157 intakes ambient air from the outside atmosphere and extract from it a part of oxygen. It then directs the oxygen-depleted air to the compressor block 158. Once there it is compressed to a barometric pressure of approximately 200 bar and then delivered into the vessel 153, communicating directly (or through a release valve) with the pipe 152.

As previously stated, curtains should be made from synthetic material. They should be soft, transparent and fully inflatable. They should have long vertical flaps, which overlap each other horizontally (as shown on FIG. 16).

These specifications insure the easy passage of vehicles through the curtains 155, as their transparent nature will not obstruct a driver's view. They will provide sufficient sector-separation, even if a truck stops directly beneath them. Similar curtains have been successfully used by Hypoxico Inc.'s Hypoxic Room System to separate the hypoxic environment from the outside atmosphere.

FIG. 16 is a cross-sectional view of a cylindrical tunnel 151, focusing on the preferred embodiment of the curtain deployment system.

The curtain 155 is folded inside the curtain holder 156. A signal from a smoke/fire detection system initiates a high-pressure or pyrotechnic cartridge 161, which results in the release of gas. This causes the curtain 155 to inflate. The inflating curtain 155 pushes open the cover 162 of the curtain holder 156 and drops down to the pavement. Separate cartridges 161 may be installed above each traffic line.

Additional separating segments 163 are installed at both sides of the curtain, above and under the pavement, allowing communication cables and pipes to pass through. Segments 163 are installed only at places where curtains 155 are installed. This combination provides a substantial air obstruction between separated sections, preventing natural ventilation. However, the curtains 155 do not prevent hypoxic air released by the FirePASS to pass through them Vertical segments 163 should be made from a soft plastic material in order to prevent damage to vehicles.

Electronic switches, thermal/smoke detectors, valves and monitors that are installed inside the tunnel will release hypoxic air. These components are widely available so they will not be described further. Various models of hypoxic generators 157 are offered solely by Hypoxico Inc. of New York. Various oxygen extraction devices can be used for this application including but not limited to: pressure-swing absorbers, membrane separators, and units using electric current swing adsorption technologies. Multiple stage compressors 158 that compress air up to 200 bar or higher are also available from numerous manufacturers throughout the world.

In certain cases, calculated amounts of pure nitrogen can be used to fill the high-pressure system. This will reduce the size, and weight of the system. When released, the exact amount of nitrogen would provide hypoxic environment with oxygen content of 15%, or lower, if needed.

Figure 17:
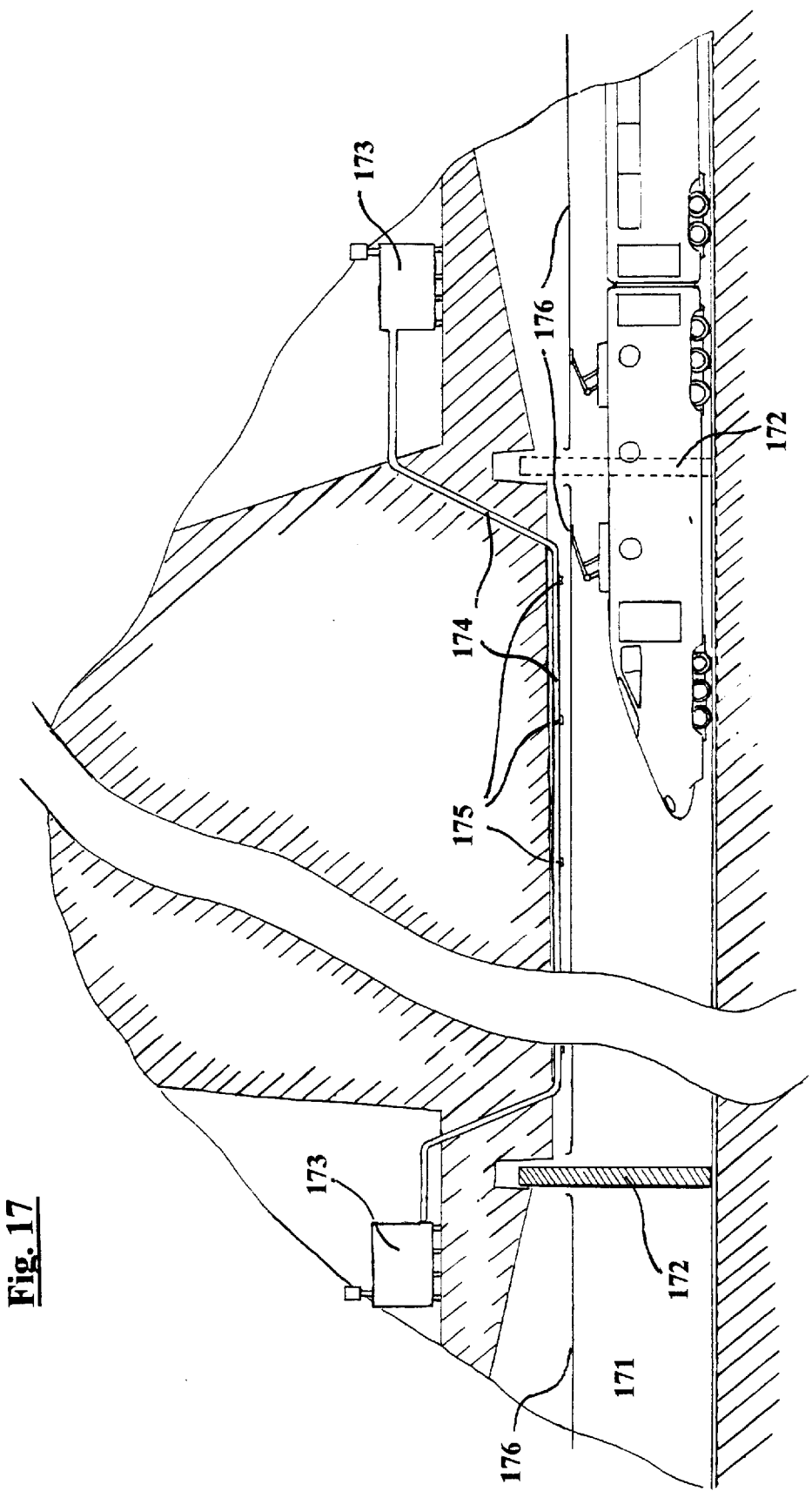
FIG. 17 shows a schematic view of the invented system for electric railroad or subway tunnels.

FIG. 17 presents a schematic view of a cost-effective Tunnel FirePASS for electric powered trains and other vehicles that do not use combustion engines. This embodiment allows the inside of the tunnel 171 to be maintained in a fire preventive environment, at or below the Hypoxic Threshold. However, this embodiment is not suitable for automobile tunnels, as combustion engines will not operate in such hypoxic environment.

The tunnel 171 is equipped with two separating doors 172 in the closed position, one on each end. When a train approaches the tunnel 171, the first door 172 opens, allowing the train to pass, and closes thereafter. As the train approaches the end of the tunnel, the second door opens, allowing the train to exit. One or more hypoxic generators 173 that have been installed outside the tunnel supply hypoxic air to the interior of the tunnel 171. Hypoxic air with an oxygen content between 14 and 15% is created by the generator and then delivered inside the tunnel 171 through piping 174 and nozzles 175. This maintains a constant fire-preventive environment in the tunnel and transmits it inside the train, since its interior becomes ventilated with the hypoxic air.

The doors 172 can be made in different shapes, e.g. a slide, swing or folding doors being opened vertically or horizontally. Such doors are available by numerous manufacturers. Doors should be installed approximately 10 to 20 meters inside the. tunnel to prevent them from being blocked by snow or ice. The electric contact cable 176 can be interrupted at the doors 172 or other joints and obstacles.

Figure 18:
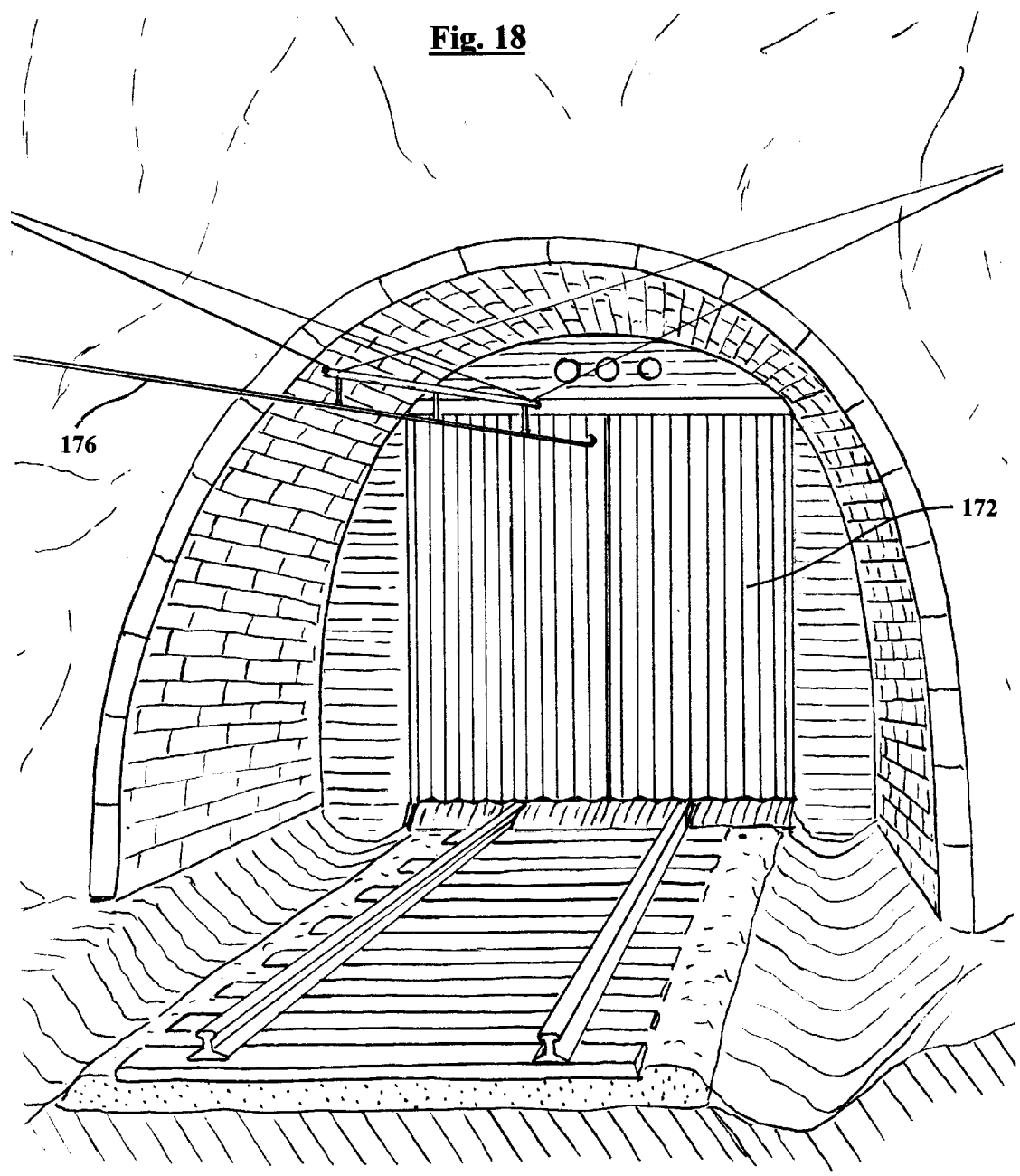
FIG. 18 shows a frontal view of the tunnel's entry, with separating door.

FIG. 18 shows a frontal view of the tunnel's entry with a closed door 172.

Figure 19:
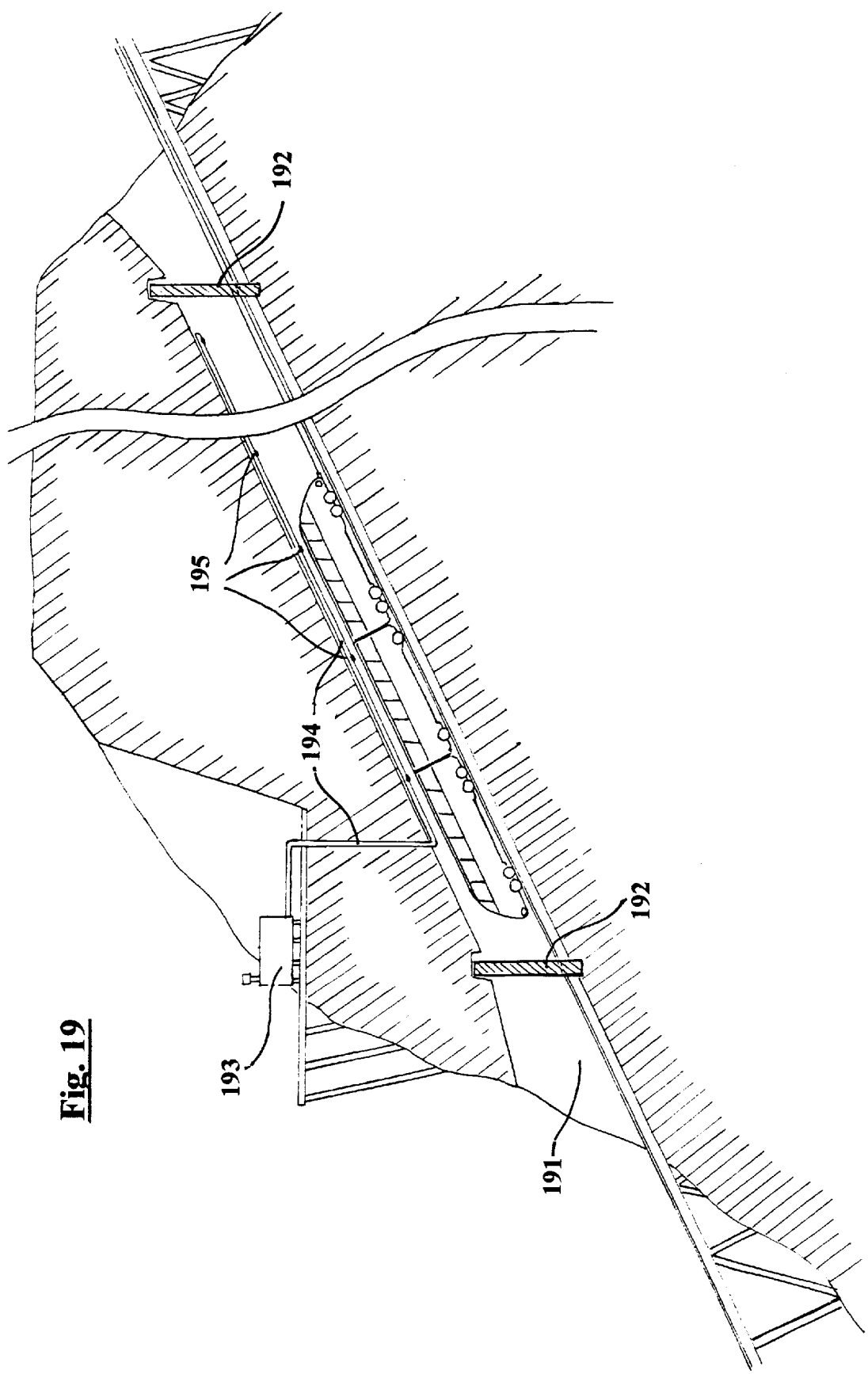
FIG. 19 presents a schematic view of the invented system for tunnels of mountain ski trains or funiculars.

FIG. 19 presents a schematic view of a ski train tunnel 171 similar to the one in Kaprun, Austria (where 159 people died in fire in November of 2000). With a length of 3.3 km, this 3.6-meter-diameter tunnel has an average gradient of 39°. This caused a "chimney effect" which sucked air from the bottom of the tunnel, thereby fanning the flames.

Doors 192 will prevent such a draft, keeping the fire-preventive environment inside the tunnel 191. Through a pipe 194 and evenly distributed (every 50 meters) discharge nozzles 195, a hypoxic generator 193 will provide the tunnel with the breathable fire-extinguishing composition at 15–16% oxygen content. Automatic doors 192 open when the train approaches, similar to doors 172 in the previous embodiment.

In addition, the oxygen-enriched fraction produced during the extraction process can be forwarded to wastewater treatment plants, fisheries, metallurgy plants, paper bleaching and food processing plants, and other businesses, providing great benefit to the local economy.

Figure 20:
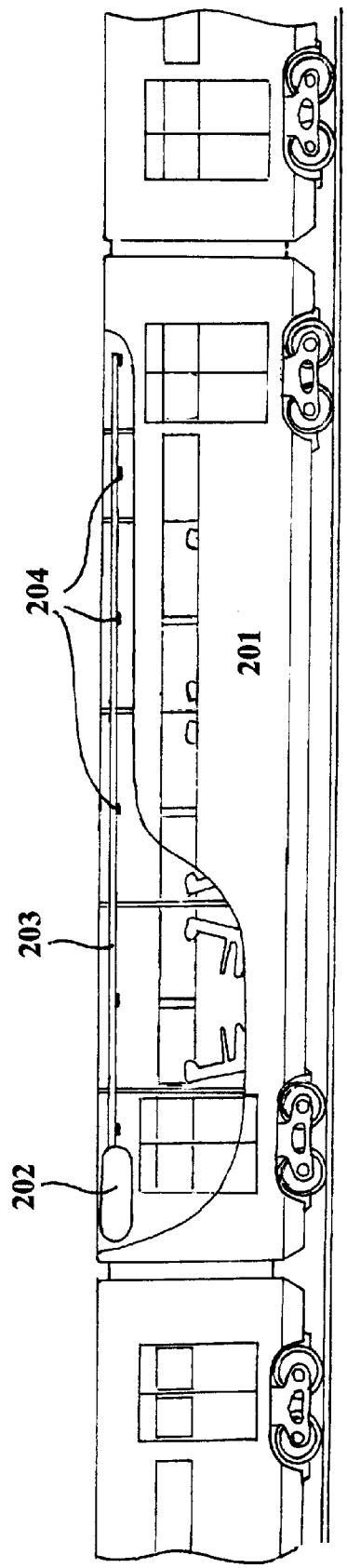
FIG. 20 shows a schematic view of the On-Board Fire-PASS that can be used in trains, buses, subway cars or other passenger vehicles.

FIG. 20 shows a schematic view of an On-Board FirePASS system for passenger trains, buses, subway cars and other passenger vehicles.

This embodiment presents the installation of a fire suppression system inside a railroad passenger car 201. A high-pressure storage container 202 is mounted under the ceiling or on the roof of the car 201. A container 202 is equipped with a discharge valve connected to distribution piping 203. Hypoxic air is then discharged through discharge nozzles 204.

When fire is detected, a burst disc discharge valve (not shown) will be initiated by an electro-explosive initiator. Burst disc discharge valves and electro-explosive initiators are available from Kidde-Fenwal Inc. in the U.S.A. Suitable containers, piping and nozzles are also available from numerous manufacturers.

Hypoxic air with oxygen content below the hypoxic threshold is stored in container 202 under a barometric pressure of 100 bar. Much lower oxygen concentrations can be used (from 0.01 to 10%O2) since in is easy to calculate the volume that is necessary upon release in order to create a breathable fire-suppressive environment at Hypoxic Threshold. This lower oxygen content reduces both the volume and weight of the high-pressure storage container 202.

For instance: in order to achieve fire-suppression at an oxygen concentration of 16%, a car interior with a volume of 200 m3 would require approximately 75 m3 of a 2% oxygen hypoxic gas mixture. At 100 atm pressure it would require only 700-liter storage container or seven 100-liter containers. The latter container would be substantially easier to install in a car 201. Pure nitrogen can be used as well, as long as it is released through multiple nozzles for better distribution. In this case, the oxygen content in the interior of the car must remain above 16%. This would require only 60 m3 of nitrogen. This can be stored in 600-liter container at 100 atm (or 300 liter container at 200 atm pressure).

All nozzles must be equipped with silencers, to reduce the noise that is created by the release of high-pressure gas.

The On Board FirePASS can be installed on buses, ferries, funiculars and other passenger vehicles. Personal automobile fire-suppression systems can also be built using the same solution.

Successfully suppressing a fire on board an in-flight aircraft is extremely difficult, as the majority of theses fires are caused by electrical defects inside the aircraft.

In order to save on weight, an airplane's construction is not strong enough to be pressurized at sea level. Consequently, all passenger aircraft are pressurized at altitudes ranging from 2 to 3 km. This reduces the pressure differential between the internal and external atmosphere while the plane is in flight. As a result of this the plane's internal atmosphere has a lower partial pressure of oxygen. However, the internal atmosphere still has an oxygen content of 20.94%. Therefore, to achieve a fire preventative state (Hypoxic Threshold) an atmosphere corresponding to an altitude of approximately 4 km would have to be created. This would be too uncomfortable for most passengers. This unfortunate condition restricts the use of the FirePASS system in the preventive mode.

Figure 21:
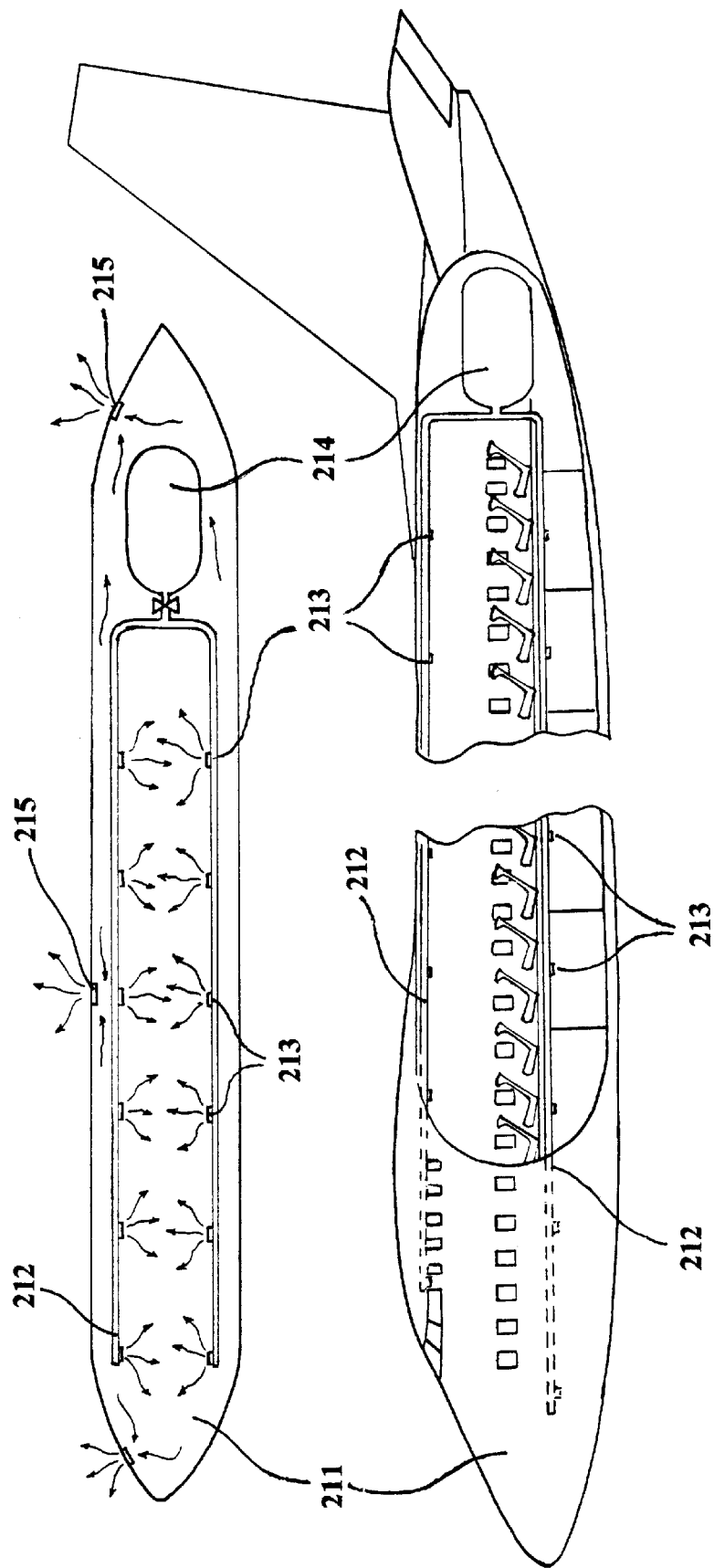
FIG. 21 illustrates the implementation of the FirePASS technology into the ventilation system of a current passenger airliner.

FIG. 21 shows the implementation of the FirePASS technology into the ventilation system of a passenger airliner 211. All such airplanes depend on the outside atmosphere for fresh air. This requires a complicated air-intake system that will not be described here. A ventilation system with distribution piping 212 and nozzles 213 provides a normal mixture of recycled air (along with a small amount of fresh air). The piping 212 communicates with a high-pressure storage container 214 that is filled up with hypoxic fire-suppressive agent or nitrogen. The container 214 is equipped with a release valve, which is initiated by an electro-explosive device described in the previous embodiment shown in FIG. 20.

In case of fire, the on-board fire/smoke detection system provides a signal that initiates the actuation of the burst disc valve by an electro-explosive device. Nitrogen or hypoxic agent is released into the ventilation system and is evenly distributed throughout the plane. The upper portion of FIG. 21 shows the movement of hypoxic air throughout the plane. The amount of hypoxic agent or nitrogen that is released must provide a hypoxic threshold throughout the entire airplane. The signal from the fire/smoke detection system will also close the intake valves that allow fresh air to enter the plane. A storage container (or multiple containers 214) containing hypoxic air at a barometric pressure at approximately 50 bar should be equipped with a gradual release valve and silencer.

Excessive gas mixture is released from the airplane through a pressure-sensitive check valve 215 that is initiated by pressure increase inside the aircraft. This will provide sufficient air change inside the aircraft, removing smoke or toxic fumes from the fire source. The atmosphere aboard the aircraft will now be at the Hypoxic Threshold and will be suitable for breathing for a limited period of time, even for the sick and elderly. This limited breathing time will be sufficient, as a fire will be suppressed in a matter of seconds. However, if exposure to the hypoxic environment must be prolonged, the simultaneous release of oxygen masks will allow passengers to remain comfortable This method of fire suppression will immediately squelch any fire. Even smoke that may be produced by residual glowing will be eliminated. Consequently, the safety of the people aboard the aircraft will be guaranteed.

FIG. 22 presents the FirePASS system aboard the next generation of airplanes that will fly above Earth's atmosphere (including spaceships). These vehicles, which are similar to NASA's Space Shuttle, do not depend on the intake of fresh air, as they are equipped with autonomous air-regeneration systems. Consequently, these vehicles are pressurized at sea level.

For decades, researchers from NASA (along with other space agencies) have been trying to find a human-friendly solution to suppress fires on board space vehicles (and space stations). The most advanced fire-suppression technology currently available uses carbon dioxide as the fire-suppressant. The advantage of using carbon dioxide is that it can easily be removed from the enclosed atmosphere by absorbers utilized in life-support systems. However, the main drawback of carbon dioxide is that upon its release, the atmosphere becomes nonbreathable.

The implementation of the FirePASS system on such an aircraft (or space shuttle 221) requires the initial establishment and maintenance of the hypoxic threshold in the atmosphere on board of the vehicle. On the ground the vehicle 221 has been ventilated through with hypoxic air supplied by the mobile FirePASS generator 222. Passengers can board the vehicle at the same time through an antechamber-type gate.

Upon the completion of full air exchange, the atmosphere will be at the Hypoxic Threshold. The door of the vehicle 221 can now be closed and the cabin can be pressurized. The internal atmosphere will now be recycled by an autonomous air-regeneration system 223. This system 223 contains a special chemical absorber (a complex composition of lithium and potassium super oxides) that absorbs carbon dioxide and produces oxygen. The control system is set to maintain oxygen content at the desired level (15% recommended).

One of the key benefits of the FirePASS technology is the ease in which it can be installed in vehicles of this nature, as no hardware modifications will be necessary. The environment can be altered by increasing the nitrogen content of the internal atmosphere. The air control system can be reprogrammed to maintain the Hypoxic Threshold. This hypoxic gas composition will provide a healthy, comfortable environment with 100% protection against fire.

Other inert gases such as argon and xenon etc. (or mixtures thereof) can also be used in as fire-extinguishing ballast. However, the hypoxic threshold will be different for each gas mixture.

The same fire-preventive composition is suitable for all hermetic objects including space stations, interplanetary colonies, and underwater/underground facilities. In the future, most of buildings will contain an artificial atmosphere that can be protected against fire by establishing a hypoxic environment with an oxygen content below 16.2%.

FIG. 23 shows a hermetic object with an artificial atmosphere. The on board life support system (not shown) incorporates the autonomous air-regeneration system 231, maintaining a healthy comfortable environment at the Hypoxic Threshold.

The regeneration block 232 collects expired air through air intakes 233 and piping 234. The equipment on this block 232 removes a portion of the water and sends it to the water regeneration block of the main life-support system. Dehumidified air is sent into the block's regenerative absorber 232 where excessive carbon dioxide is absorbed. In addition, an appropriate amount of oxygen is added, thereby insuring that the internal atmosphere is maintained at the Hypoxic Threshold. A computerized control unit 235 maintains the temperature, the humidity, and the oxygen/carbon dioxide balance in the air-supply system 237. Nozzles 238 are distributed evenly throughout the enclosed space, or in each enclosed compartment. Supplemental oxygen (and nitrogen, if needed) is stored in containers 239. However, once nitrogen is introduced into the internal atmosphere, it will remain there without needing further regeneration.

The same fire-preventive composition with can be used in submarines, underwater stations, space and interplanetary stations.

These environments have one thing in common: they cannot rely on the outside atmosphere for ventilation or air exchange. Fires in such environments are extremely dangerous and difficult to suppress. Oxygen is typically generated through chemical, biological or electrolytic means. In a spaceship (or space station) oxygen must be stored onboard the vehicle prior to liftoff.

If the maintenance of a constant hypoxic environment (fire preventive mode) is not feasible, then the system can be maintained in its fire-suppression mode. It can then be introduced when required. Depending on the size of the environment, the vehicle can be divided into fire-suppression zones. Localization can be achieved by separating different sectors of the environment with inflatable air curtains, hermetic doors or hatches. In case of fire the necessary amount of nitrogen will be introduced into the localized sector, instantly creating a hypoxic environment under the Hypoxic Threshold.

Figure 24:
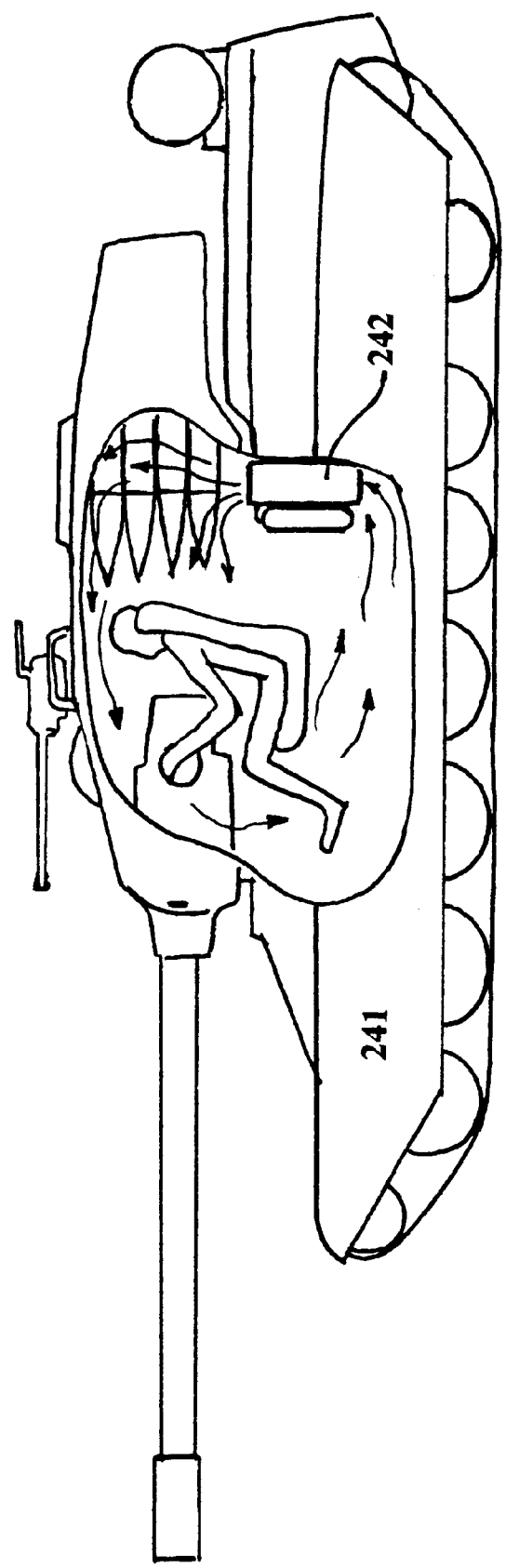
FIG. 24 shows the implementation of the hypoxic Fire-PASS technology into an autonomous air-regenerative system of a military vehicle.

FIG. 24 shows the implementation of the FirePASS technology into the autonomous air-regenerative system of a military vehicle. The tank 241 has a hermetically sealed environment with an internal atmosphere under the hypoxic threshold. The working principle of this system is identical to the one that was described in the previous embodiment (FIG. 23).

The air-regeneration system 242 employs a chemical absorbent that adsorbs carbon dioxide and releases the appropriate amount of oxygen. This maintains the internal atmosphere of the vehicle below the Hypoxic Threshold (preferably from 12 to 13%). Military personnel can easily adapt to this environments by sleeping in a Hypoxic Room System (or Hypoxic Tent System) manufactured by Hypoxico Inc.

The same concept applies to military aircraft, submarines and other vehicles. One of the key advantages of employing a hypoxic, fire-extinguishing composition in military vehicles is that it provides a fire-safe internal environment for the soldier, even if the vehicle is penetrated by ammunition.

Hypoxic fire-prevention compositions and methods employing FirePASS technology guarantee that a fire will not get started under any circumstances.

FIG. 25 is a schematic view of a space station 251 employing hypoxic fire-preventive composition as its permanent internal atmosphere. The air-regeneration system 252 continuously collects expired air from the station's inhabitants. It then provides a comfortable fire-preventive atmosphere with oxygen content at or below the Hypoxic Threshold (12–15% range recommended). The working principle of this system is shown schematically in FIG. 23.

The greatest advantage to implementing a breathable, fire-preventive composition into a hermetic, human-occupied environment is its ability to automatically maintain the Hypoxic Threshold. Once introduced, the inert nitrogen gas will always be present in such artificial atmosphere in its original concentration—no refill or regeneration will be required. It cannot be consumed by the inhabitants or adsorbed by an air-regeneration system. This factor automatically maintains the Hypoxic Threshold (or a lower level of oxygen in a breathable range) in a hermetic artificial atmosphere being maintained at constant barometric pressure.

FIG. 26 presents a schematic view of a marine vessel 261 such as a tanker, a cargo ship, a cruise ship or a military vessel. A ship cannot be completely protected by a fire-preventive atmosphere, as some rooms must be frequently ventilated with normoxic air Consequently, the Marine Fire-PASS must be installed in dual mode. The Fire Pass (operating in its suppression mode) can protect rooms that are frequently ventilated. The following is a brief list of the appropriate operating mode of operation in a given area:

fire-suppression circuit (e.g. machine and upper deck personnel rooms)

fire-prevention circuit (e.g. liquid or dry cargo area, arsenal, computer center and hardware storage rooms on board of a military vessel)

The Marine FirePASS consists of a hypoxic generator 262 that takes in ambient air, and supplies the hypoxic fire-preventive composition through the fire-prevention circuit 263. Discharge nozzles 264 are located in each cargo or military hardware compartment. The system constantly maintains a fire-preventive atmosphere through the continuous supply of air with oxygen content below the hypoxic threshold. Excessive air exits through simple ventilation openings or pressure equalization valves (not shown).

The fire-suppression circuit of the Marine FirePASS consists of a high-pressure container 265, a compressor 266 and distribution piping 267. Nozzles 268 are located in each room, plus any additional areas covered by the circuit.

The working principle of the Marine FirePASS is shown schematically on FIG. 27. The generator 262 takes in ambient air, extracts oxygen, and then supplies the oxygen-depleted fraction to the fire-preventive circuit 271. The covered area 272 is constantly ventilated with fresh hypoxic air that exits the protected environment 272 through a ventilation hole 273.

The fire-suppressive composition is maintained under high pressure by a compressor 266 in a storage container 265. In case of fire, an electro-explosive initiator described earlier actuates a release valve 274. This causes the hypoxic fire-suppressive composition from the container 265 to replace (or dilute) the atmosphere in the fire-suppression circuit area 275. Consequently, a breathable fire-suppressive atmosphere with an oxygen content under the Hypoxic Threshold (preferably between 10% and 14%) is established throughout the circuit.

The Hypoxic FirePASS can be used in any human occupied facility, including but not limited to: rooms for data processing, telecommunication switches, process control and Internet servers; banks/financial institutions, museums, archives, libraries; military and marine facilities, aircraft, space vehicles/stations, underground/underwater facilities; marine vessels; facilities operating with inflammable/ explosive materials, transportation tunnels, private homes, apartment and office complexes, and all other enclosed environments that require the prevention and suppression fire hazards. More information will be provided on the Internet at: www.firepass.com.

What is claimed is:

1. A system for providing breathable fire-preventive and fire-suppressive atmosphere in enclosed human-occupied spaces, said system comprising:

an enclosing structure having an internal environment therein containing a gas mixture which is lower in oxygen content than air outside said structure, and an entry communicating with said internal environment;

an oxygen-extraction device having an inlet taking in an intake gas mixture and first and second outlets, said first outlet transmitting a first gas mixture having a higher oxygen content than the intake gas mixture and said second outlet transmitting a second gas mixture having a lower oxygen content than the intake gas mixture;

said second outlet communicating with said internal environment and transmitting said second mixture into said internal environment so that said second mixture mixes with the atmosphere in said internal environment;

said first outlet transmitting said first mixture to a location where it does not mix with said atmosphere in said internal environment;

said internal environment selectively communicating with the outside atmosphere and emitting excessive internal gas mixture into the outside atmosphere;

said intake gas mixture being ambient air taken in from the external atmosphere outside said internal environment.

2. The system according to claim 1 and said atmosphere in the internal environment being breathable fire-extinguishing gas composition having oxygen content ranging from 10% to 17%.

3. The system according to claim 1 and said oxygen-extraction device employing molecular-sieve adsorption technology in order to extract part of oxygen from said intake gas mixture.

4. The system according to claim 1 and said oxygen-extraction device employing oxygen-enrichment membrane or other air separation technology in order to extract part of oxygen from said intake gas mixture.

5. The system according to claim 1 and said second outlet additionally communicating with a high-pressure storage container for providing sufficient supply of said second gas mixture that can be released into said internal environment in order to suppress possible fire when said internal environment does not initially contain said second gas mixture.

6. The system according to claim 1 and said atmosphere being recycled by a split air-conditioning system in order to control the temperature and humidity inside said internal environment.

7. The system according to claim 1 and said enclosing structure with said internal environment therein being area selected from the group consisting of, but not limited to: rooms and enclosures for data processing and process control equipment, telecommunication switches and Internet servers; banks and financial institutions, museums, archives, libraries and art collections; dwellings and office buildings;

military and marine facilities; aircraft, space vehicles and space stations, marine and cargo vessels; industrial processing and storage facilities operating with inflammable and explosive materials and compositions and other industrial and non-industrial facilities and objects that require fire safety in human-occupied environments.

8. A breathable fire-extinguishing gas composition for continuous use in human-occupied environments as an artificial fire-preventive atmosphere, said gas composition comprising:

a mixture of nitrogen and oxygen at an atmospheric pressure being ambient or positive for location of use;

said mixture having oxygen content in a range above 12% but below 18%;

said mixture having nitrogen content above 82% but not exceeding 87.6%;

said mixture containing water vapors, carbon dioxide and other atmospheric gases in quantities that are acceptable for the breathing process;

said mixture having controllable temperature and humidity.

9. The gas composition according to claim 8 and said atmosphere receiving said composition constantly in amounts sufficient for ventilation of said environments in order to maintain breathing quality of the atmosphere;

said environments communicating with external atmosphere allowing excessive composition to exit into the outside atmosphere.

10. The gas composition according to claim 8 and said artificial atmosphere being created initially by introducing said mixture into a hermetic human-occupied object having life-support system maintaining said atmosphere at initial hypoxic settings;

said hermetic object being selected from a group comprising: an aircraft, space station or vehicle, underwater or underground facilities and vehicles, and other isolated human-occupied objects for living, working or transport;

said artificial atmosphere not communicating with the external atmosphere outside said hermetic object.

11. A fire extinguishing gas agent and fire suppression system for use in enclosed and partially enclosed human-occupied spaces for fire suppression, said system and gas agent comprising:

a mixture of nitrogen, oxygen and other optional atmospheric gases contained in a high-pressure gas container;

said mixture having oxygen content in a range from 0.01% to 16%, said mixture having nitrogen content ranging from 84% to 99.99%;

the amount of said gas agent detained in or released from said container being so calculated that when gas agent is released into said enclosed space, it provides a breathable fire-suppressive atmosphere inside said space having oxygen concentration in a range from 10% to 16%.

12. The gas agent and system according to claim 11 and said gas container containing said agent at barometric pressure above 10 bar and releasing it when a signal from fire and smoke detecting equipment is received;

said container having a release valve initiated by an electro-explosive initiator actuated by said signal;

said container having gas release nozzles connected directly or through optional gas distribution piping;

said nozzles having optional noise reducing device in order to reduce level of sound from gas release.

13. The system according to claim 11 and said container being installed in combination with an oxygen-extraction device and receiving said gas agent from it, the agent being constantly maintained under selected barometric pressure by said device and/or intermediate compressor.

14. The system according to claim 11 and said container being a free standing container having an individual fire and/or smoke detection system that initiates release of said gas agent in case of fire.

15. An automatic system for providing breathable fire-suppressive atmosphere for transportation and communication tunnels, industrial and non-industrial buildings and structures, said system comprising:

an interior space restricted by a wall structure having an entry and exit, and multiple isolating partitions defining selected segments of the interior space; said isolating partitions being selectively closable in case of fire so that when closed, the segments are substantially isolated from the outside environment;

an oxygen-extraction device having an intake and first and second outlets, said device taking in ambient air through said intake and emitting a reduced-oxygen gas mixture, having a lower concentration of oxygen than ambient air, through said first outlet and enriched-oxygen gas mixture, having a greater concentration of oxygen than ambient air, through said second outlet;

a gas storage container having receiving conduit and distribution conduit and containing said reduced-oxygen gas mixture under higher than ambient barometric pressure, said receiving conduit being operatively associated with said first outlet and receiving said reduced-oxygen gas mixture after intermediate compression therefrom;

said distribution conduit communicating with said interior space so that the reduced-oxygen gas mixture is emitted in case of fire into one or multiple segments inside said interior space;

said second outlet communicating with the outside atmosphere and releasing said enriched oxygen mixture into the outside environment;

said reduced oxygen gas mixture having oxygen concentration below 16%;

said reduced oxygen gas mixture, being released inside selected segments of said interior space in case of fire and providing a breathable fire-suppressive composition with oxygen content preferably ranging from 12% to 16%;

said composition emitting from said interior space in amounts necessary to equalize atmospheric pressure inside said interior space with the outside atmospheric pressure.

16. The system according to claim 15 and said multiple isolating partitions being inflatable drop curtains normally kept deflated and folded in curtain holders installed under ceiling throughout the interior space;

said drop curtains being made of a clear and soft synthetic material in form of inflatable flaps so when inflated, they provide a sufficient obstruction for the draft or any substantial air movements into selected segments;

said curtains being inflated by a gas from a pyrotechnical device or container initiated by a signal from fire-detecting equipment.

17. The system according to claim 15 and said interior space being selected from the group comprising of rooms, houses and buildings, transportation tunnels and vehicles, underground and underwater facilities, marine vessels, aircraft, military installations and vehicles, and other human occupied objects.

18. An automatic system for providing fire-preventive hypoxic atmosphere for transportation and communication tunnels, industrial and non-industrial buildings and structures, said system comprising:

an enclosed space comprising an entry, exit and a wall structure defining said enclosed space, said entry and exit having doors being selectively closable so that when closed, the enclosed space is substantially isolated from the outside environment;

a gas processing device having an intake and first and second outlets, said device taking in ambient air through said intake and emitting a reduced-oxygen gas mixture, having a lower concentration of oxygen than ambient air, through said first outlet and enriched-oxygen gas mixture, having a greater concentration of oxygen than ambient air, through said second outlet;

said first outlet communicating with a gas distribution piping having multiple discharge nozzles inside the enclosed space so that reduced oxygen gas mixture is transmitted into said enclosed space;

said reduced oxygen gas mixture having oxygen content below 17% and above 12%;

said gas processing device comprising an air pump, receiving ambient air through the intake from the outside atmosphere, and an oxygen-extraction module receiving compressed air from the pump, said oxygen-extraction module having a reduced oxygen mixture conduit and an enriched oxygen mixture conduit;

said first outlet being operatively associated with said reduced oxygen mixture conduit and receiving said reduced oxygen gas mixture therefrom, said second outlet being operatively associated with said enriched oxygen mixture conduit and receiving said enriched oxygen gas mixture therefrom and releasing said mixture into the outside environment;

said reduced oxygen gas mixture emitting from said enclosed space in amounts necessary to equalize atmospheric pressure inside said space with the outside atmospheric pressure.

19. The system according to claim 18 and said enclosed space being selected from the group comprising of computer rooms, houses and buildings, transportation and communication tunnels, nuclear power plants, underground and underwater facilities, marine vessels, and other non-hermetic human occupied objects.

20. An apparatus for providing breathable fire-extinguishing composition for human occupied environments, said apparatus comprising:

a compressor and an air separation device having an intake and first and second outlets, said device taking in compressed air provided by said compressor through said intake and emitting a reduced-oxygen gas mixture having a lower concentration of oxygen than said gas mixture through said first outlet and enriched-oxygen gas mixture having a greater concentration of oxygen than said gas mixture through said second outlet;

said intake being connected to a distribution valve providing distribution of compressed air to multiple inlets communicating each with an individual separation container filled with a molecular sieve material that under pressure adsorbs nitrogen and water vapors, allowing enriched-oxygen gas mixture to pass through into a gas collecting tank communicating with said second outlet and being operatively associated with all said separation containers and receiving said enriched-oxygen gas mixture therefrom;

each said separation container being pressurized and depressurized in cycling manner and releasing during each depressurization cycle said reduced-oxygen gas mixture being delivered into said first outlet.

21. The apparatus according to claim 20 and said second outlet having release valve allowing to keep said enriched-oxygen gas mixture being collected in said gas collecting tank under increased atmospheric pressure, so when any of said separation containers depressurizes, a portion of said enriched-oxygen gas mixture is released from said tank back into said container purging said molecular sieve material from remaining nitrogen and water.

22. The apparatus according to claim 20 and said distribution valve being air distribution device selected from the group consisting of electrical mechanical, air piloted and solenoid valves, both linear and rotary configuration, with actuators controlled by pressure, mechanical spring, motor and timer.

23. The apparatus according to claim 20 and said distribution valve being mounted on manifold that is selectively communicating with said multiple separation containers and said first outlet, and selectively allowing periodic access of pressurized air inside said containers and exit of said reduced-oxygen gas mixture therefrom.

24. An automatic fire-extinguishing device for providing breathable fire-suppressive atmosphere inside an enclosed space, said device comprising:

a container having release valve and initiator communicating with a smoke/fire detection device, said container containing oxygen-reduced gas mixture under barometric pressure above 10 bar;

said initiator actuating the release valve when signal from said detection device is received;

the release valve releasing said oxygen-reduced gas mixture into said enclosed space and providing there said breathable fire-suppressive atmosphere with oxygen content ranging from 10 to 16%.

25. The invention according to claim 24 and said oxygen-reduced gas mixture containing nitrogen in a range from 84% to 100% and may contain up to 16% of oxygen.

26. The invention according to claim 24 and said gas mixture being mixture of nitrogen and carbon dioxide that may contain up to 16% of oxygen;

carbon dioxide content in said mixture being preferably below 30%.

27. A method and equipment for automatically maintaining a breathable fire-preventive composition on board a human-occupied hermetic object, said system comprising:

an initial introduction of said composition containing nitrogen into said hermetic object, said introduction provided by an oxygen-extraction apparatus directly or via an intermediate gas storage container, so when said composition completely replaces air inside said object and an internal atmosphere is created, the object being sealed and further air regeneration provided by an on-board life-support system;

said life-support system maintaining constant barometric pressure on board and regenerating said internal atmosphere by providing desired levels of oxygen, carbon dioxide and humidity, but not affecting the nitrogen content in any way;

said internal atmosphere containing a ballast, preventing oxygen content from rising above 16%;

said ballast being inert nitrogen being constantly present in said internal atmosphere in a range between 84% and 88%;

said atmosphere having oxygen concentration in a range from 12 to 16%.

28. The invention according to claim 27 and said hermetic object being selected from a group comprising: an aircraft, space station or space vehicle, submarine, military vehicles and facilities, underwater or underground facilities, and other isolated human-occupied objects for living, working or transport.

* * * * *